United States Patent
Benedict et al.

(10) Patent No.: US 9,669,671 B2
(45) Date of Patent: Jun. 6, 2017

(54) VEIN PUMP ASSEMBLY FOR AIR MAINTENANCE TIRE

(71) Applicant: The Goodyear Tire & Rubber Company, Akron, OH (US)

(72) Inventors: Robert Leon Benedict, Tallmadge, OH (US); Thulasiram Gobinath, Hudson, OH (US); Cheng-Hsiung Lin, Hudson, OH (US); Robin Lamgaday, Wadsworth, OH (US); Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/848,404

(22) Filed: Sep. 9, 2015

(65) Prior Publication Data
US 2015/0375575 A1    Dec. 31, 2015

Related U.S. Application Data

(63) Continuation-in-part of application No. 13/659,080, filed on Oct. 24, 2012, now abandoned.

(51) Int. Cl.
    *B60C 23/12*    (2006.01)
(52) U.S. Cl.
    CPC .................. *B60C 23/12* (2013.01)
(58) Field of Classification Search
    CPC ..... B60C 23/001; B60C 23/004; B60C 23/10; B60C 23/12; F16K 15/144; F16K 15/147; F16K 15/20; F16K 15/202
    See application file for complete search history.

(56) References Cited

U.S. PATENT DOCUMENTS

| 15,192 | A | 6/1856 | Peale |
| 3,304,981 | A | 2/1967 | Sheppard |
| 3,822,720 | A | 7/1974 | Souza |
| 4,295,412 | A | 10/1981 | Hachiro |
| 5,218,993 | A | 6/1993 | Steinberg et al. |
| 6,824,117 | B2 | 11/2004 | Horton |
| 7,028,981 | B2 | 4/2006 | Horton |
| 7,225,845 | B2 | 6/2007 | Ellmann |
| 8,042,586 | B2 | 10/2011 | Losey et al. |

(Continued)

FOREIGN PATENT DOCUMENTS

| CN | 1360668 A | 7/2002 |
| CN | 101432152 A | 5/2009 |

(Continued)

OTHER PUBLICATIONS

Chinese Search Report received on Oct. 23, 2015.
EPO Search Report received by Applicant on Feb. 2, 2017.

*Primary Examiner* — Kip T Kotter
(74) *Attorney, Agent, or Firm* — Edward T. Kennedy

(57) ABSTRACT

An air maintenance tire and air pump assembly is provided including a tire and an elongate tubular air passageway enclosed within a flexing region of a tire sidewall. A plurality of check valve devices are spaced apart and positioned along the air passageway into multiple air passageway segments. A check valve membrane opens to allow pressurized air to directionally pass through the check valve device from an upstream passageway segment to a downstream passageway segment and closes to prevent air from passing in an opposite direction through the check valve from the downstream segment to the upstream segment.

12 Claims, 23 Drawing Sheets

(56) References Cited

U.S. PATENT DOCUMENTS

| | | |
|---|---|---|
| 8,113,254 B2 | 2/2012 | Benedict |
| 8,534,335 B2 | 9/2013 | Benedict |
| 8,960,249 B2 | 2/2015 | Lin |
| 2004/0112495 A1 | 6/2004 | Weise |
| 2005/0263187 A1 | 12/2005 | Jernigan et al. |
| 2009/0044891 A1 | 2/2009 | Lee |
| 2012/0073716 A1 | 3/2012 | Benedict |
| 2013/0112328 A1 | 5/2013 | Hinque et al. |

FOREIGN PATENT DOCUMENTS

| | | |
|---|---|---|
| CN | 102233797 A | 11/2011 |
| CN | 102416825 A | 4/2012 |
| EP | 2433822 A1 | 3/2012 |
| EP | 2502760 A1 | 9/2012 |
| EP | 2719553 A2 | 4/2014 |

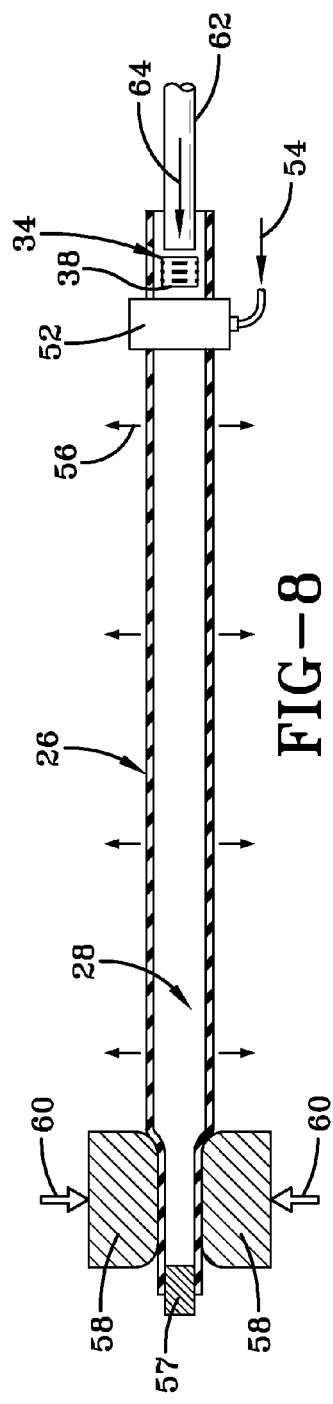
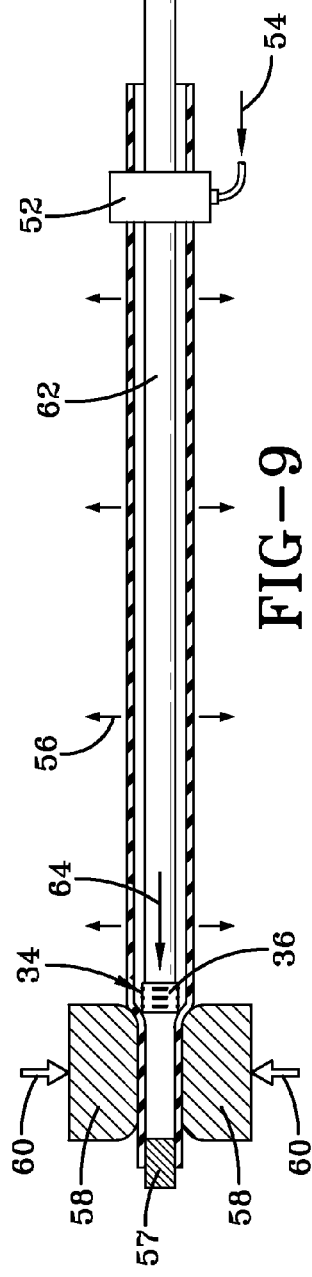
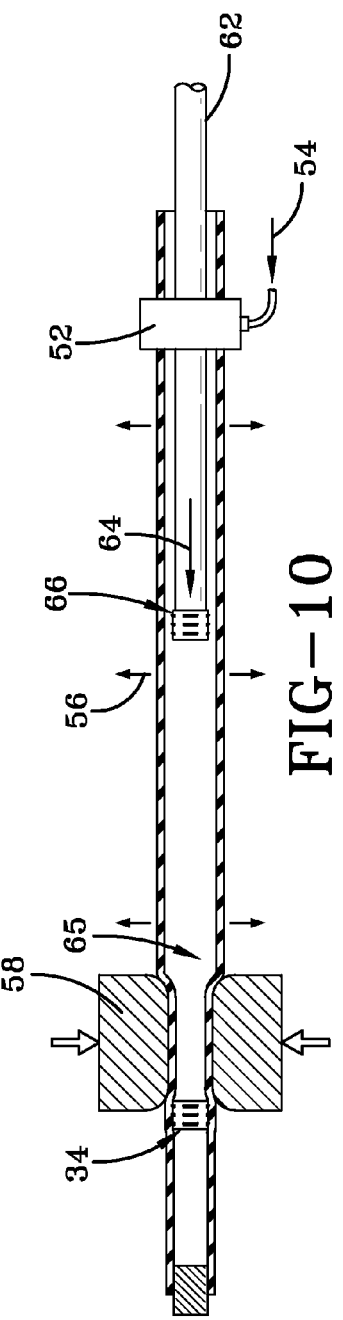
FIG-8
FIG-9
FIG-10

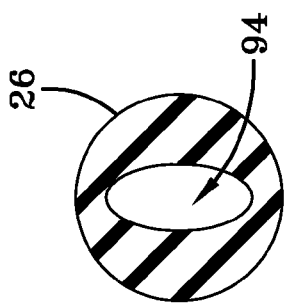
FIG-18
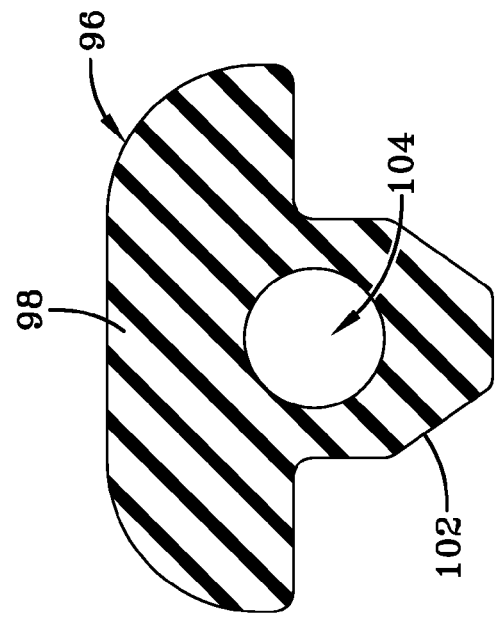
FIG-19
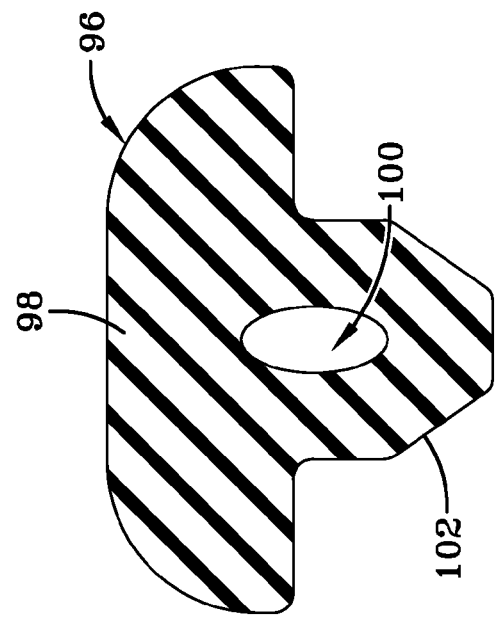
FIG-20
FIG-21

VEIN PUMP ASSEMBLY FOR AIR MAINTENANCE TIRE

FIELD OF THE INVENTION

The invention relates generally to air maintenance systems for a tire and, more specifically, to such systems that affix an air pump apparatus to a tire which maintains air pressure within the tire as the tire rotates.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire pressure monitoring systems have been proposed to warn drivers when tire pressure is significantly low. Such systems, however, remain dependent upon the driver taking remedial action when warned to re-inflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

In one aspect of the invention, an air maintenance tire and air pump assembly is provided including a tire; an elongate tubular air passageway enclosed within a flexing region of a tire wall, the air passageway having an air inlet portal operable to admit air into the air passageway and an outlet portal spaced apart from the inlet portal operable to withdraw pressurized air from the air passageway, the air passageway operably closing segment by segment in reaction to induced forces from the tire flexing region as the flexing region of the tire wall rotates opposite to a rolling tire footprint. Multiple spaced apart check valve devices are seated within and along the axial air passageway, dividing the air passageway into multiple passageway segments. Each check valve device has an external dimension and configuration operable to substantially occupy the air passageway. A valve gate, such as a membrane, allows pressurized air to directionally pass through the check valve device from an upstream passageway segment to a downstream passageway segment. The valve gate in a closed position prohibits air from passing in an opposite direction through the check valve body from the downstream passageway segment to the upstream passageway segment.

In another aspect, the air passageway may alternatively be configured as an integrally formed passageway within the tire sidewall or as an axial passage provided by a flexible air tube that is assembled to the tire in a post-cure procedure.

According to another aspect, each check valve device is configured as a tubular body closely received within the air passageway, the tubular body having outwardly projecting retention barb(s) for securing the tubular body at a preferred location within the air passageway. The tubular body houses a flexible membrane member which serves as the valve gate. The membrane opens along a slit to admit pressurized air from one side of the check valve device to an opposite side.

The check valve devices, in another aspect, may be positioned and spaced along a continuous air passageway extending between the inlet and outlet portals, or, alternatively, serve to connect air tube segments together in a splicing check valve configuration.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire tread dimensioned and configured in section for receipt of an air tube therein and where the tread may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 8 is a partial section view showing a check valve being introduced into an inflated tube by a rod.

FIG. 9 is a partial section view showing the check valve being seated in place in an inflated tube by the rod.

FIG. 10 is a partial section view showing a second check valve being introduced into the inflated tube by a rod.

FIGS. 18, 19, 20 and 21 show alternative embodiments of peristaltic tube configurations suitable for use with the check valves.

DETAILED DESCRIPTION OF THE INVENTION

Figure 1:
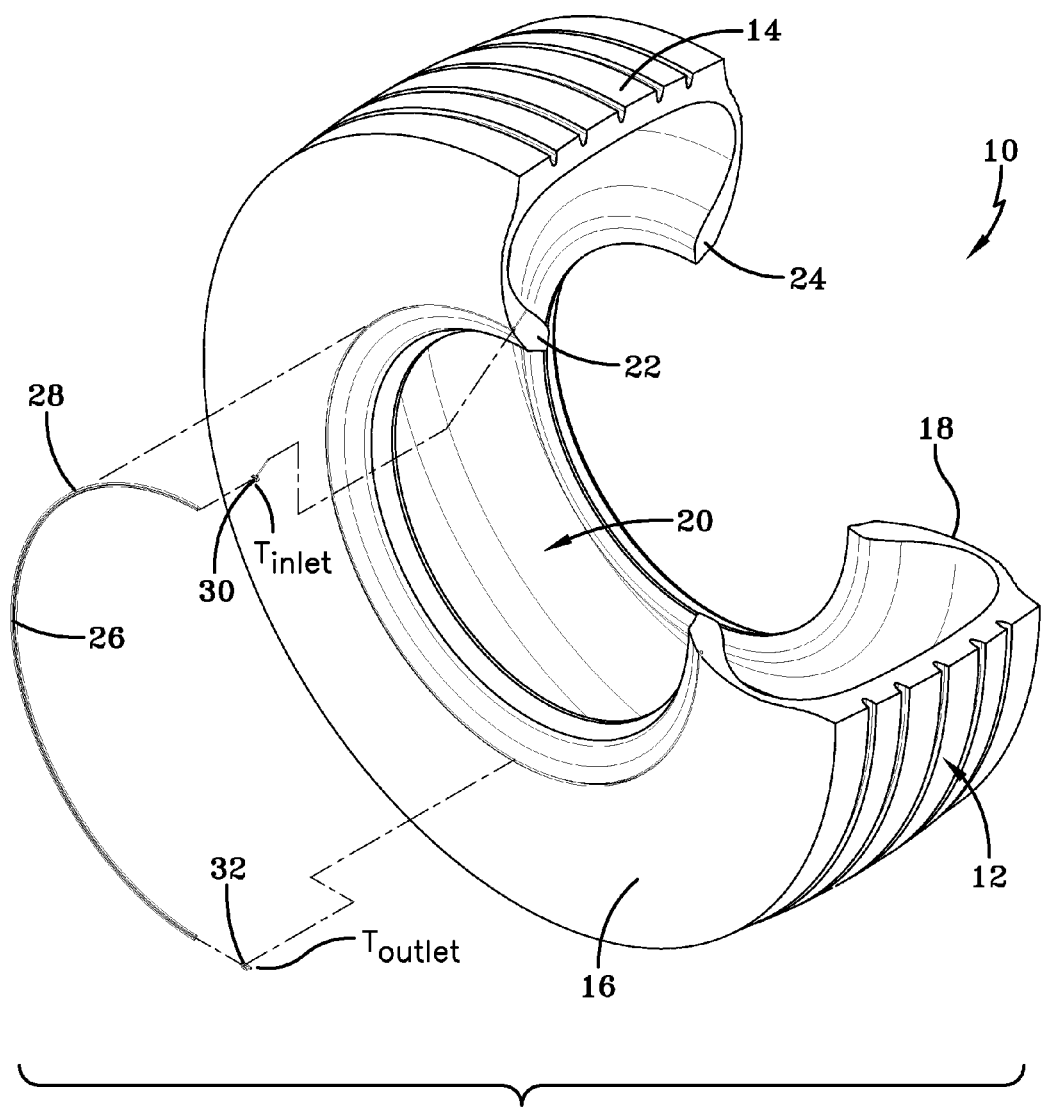
FIG. 1 is a perspective view of a tire and air pumping system assembly.

Referring to FIG. 1, a tire 12 and air maintenance pump assembly 10 (forming an air maintenance tire or "AMT") includes a tire and a vein pump assembly including an air tube 26. The general operation of a peristaltic pump for use in a tire is described in U.S. Pat. Nos. 8,113,254 and 8,042,586 which were both filed on Dec. 12, 2009, and issued on Feb. 14, 2012, and Oct. 25, 2011, respectively, and are incorporated herein in their entirety by reference. The tire is constructed to provide a tread region 14, a pair of sidewalls 16, 18 extending from opposite bead areas 22, 24 to the tire tread region 14. The tire encloses a tire cavity 20. The air maintenance assembly includes an elongate air tube 26 that encloses an annular passageway 28. The tube 26 is formed of a resilient, elastomeric flexible material such as plastic or rubber compounds and composites that are capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purpose of maintaining air pressure within the cavity 20. The tube 26 is shown to follow a 180 degree semi-circular path in the configuration of FIG. 1. However, other configurations may be employed as will be described without departing from the invention.

The air maintenance vein pump assembly further includes an inlet device 30 and an outlet device 32 spaced apart approximately 180 degrees at respective opposite end locations of the air tube 26. The outlet device 32 has a T-shaped configuration in which T-forming sleeves connect to an end of the tube 26 and an outlet conduit conducts air from the tube to the tire cavity 20. The inlet device 30 likewise is of a T-shaped configuration, connecting to an opposite end of the tube 26 and having an inlet conduit which intakes outside air into the tube passageway 28. The pending applications previously identified and incorporated herein provide the details of the outlet and inlet devices. Situated within the inlet and outlet devices are appropriate, commercially available valve mechanisms for controlling air intake into the tube 26 and outlet from the tube into the cavity 20.

Figure 2:
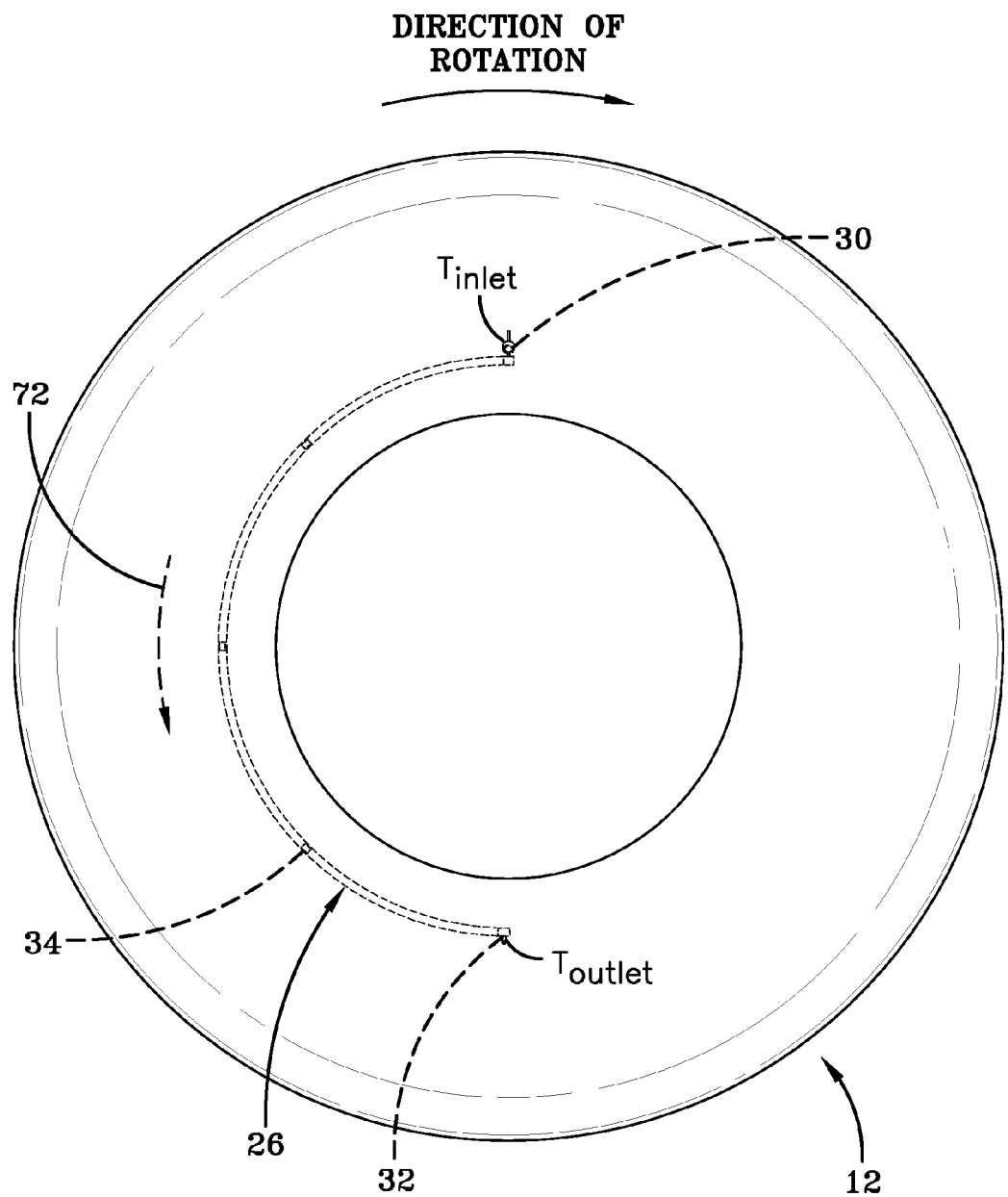
FIG. 2 is a side view of the tire with a 180 degree peristaltic tube and multiple check valves in place.

As will be appreciated from FIG. 2, the air tube 26, inlet device 30, and the outlet device 32 are positioned within an appropriately complementarily configured channel within one of the tire sidewalls. As the tire rotates in the direction of rotation indicated, a footprint is formed against a ground surface (not shown). A compressive force is thus directed into the tire from the footprint and acts to flatten a segment of the air tube 26 and passageway 28. As the tire rotates further, the air tube and passageway are sequentially flattened and pump air in the direction 72 shown. Flattening of the tube segment by segment thereby forces air from the inlet along tube passageway 28, until the pressurized air is directed from the outlet and into the tire cavity. Appropriate valve mechanism at the outlet will vent the air in the event that the tire cavity pressure is at or above the recommended tire pressure. Pumping of air occurs for one-half the revolution of the tire with the 180 degree air tube configuration shown.

Figure 3:
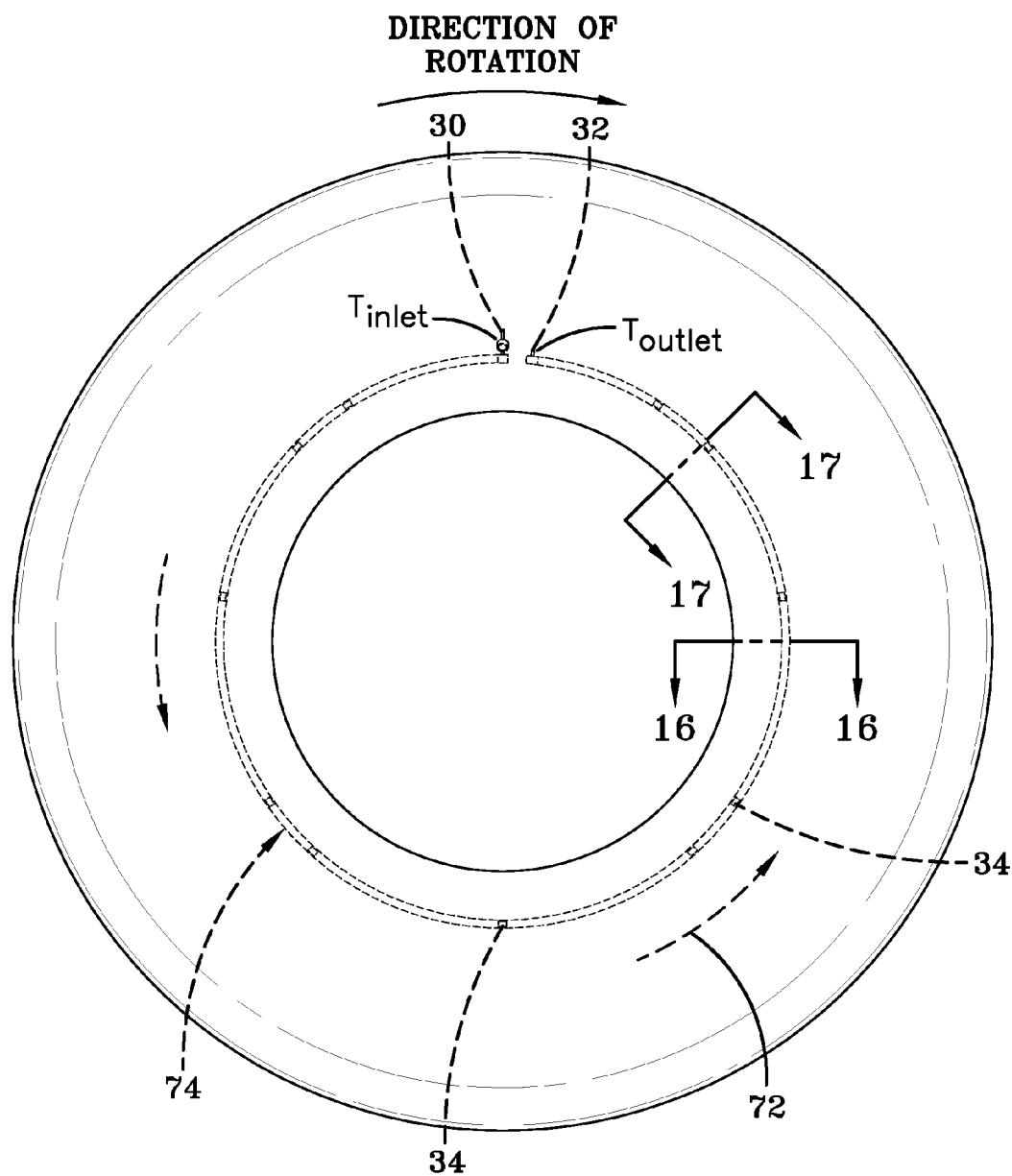
FIG. 3 is a side view of the tire with a 360 degree peristaltic tube alternative embodiment.
Figure 4:
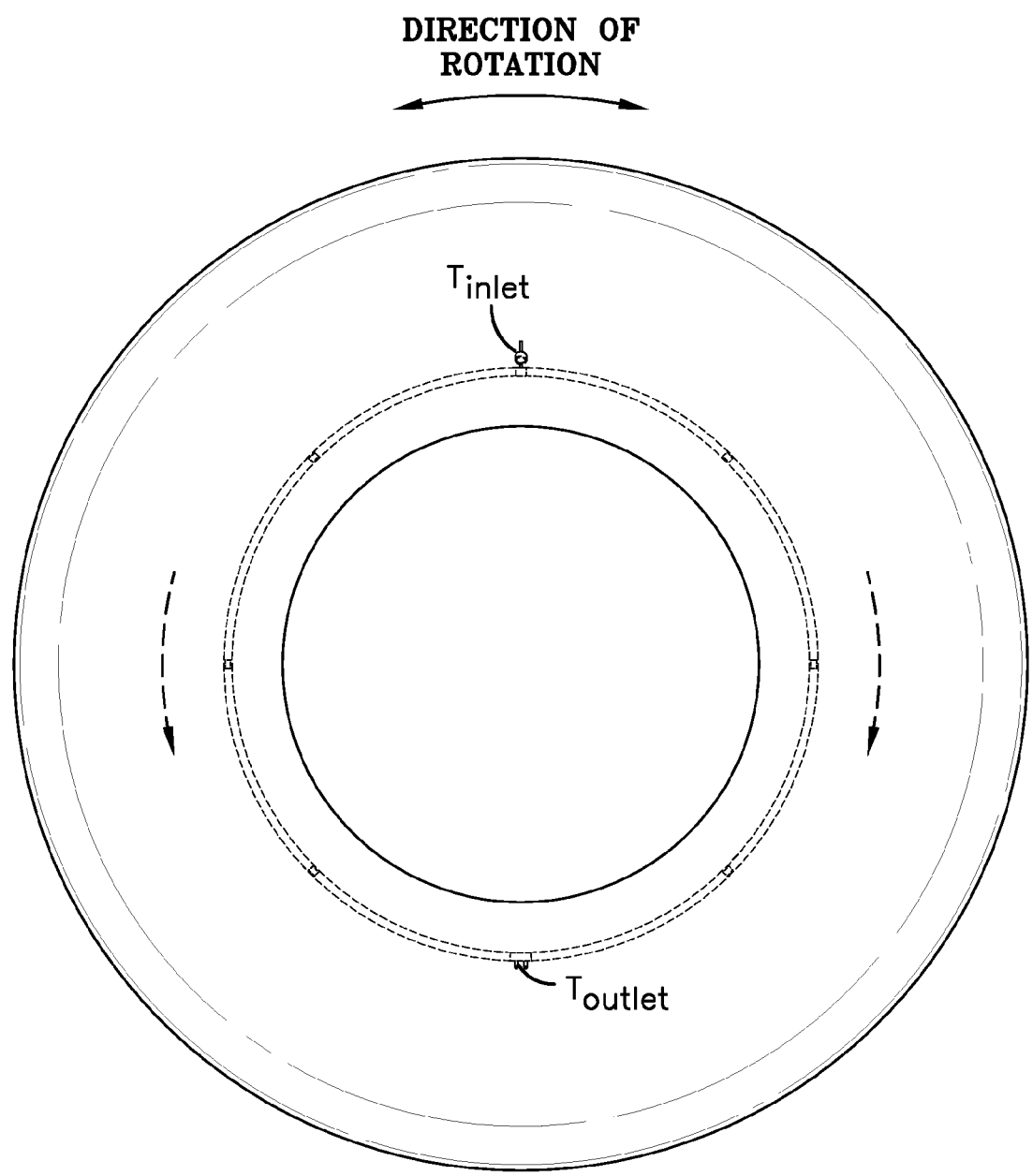
FIG. 4 is a side view of the tire with two 180 degree peristaltic tubes in an alternative embodiment.

FIG. 3 shows an alternative 360 degree air tube which functions as described above, with the exception that air is pumped along the air tube in direction 72 for the entire 360 degree revolution of the tire. FIG. 4 shows a tire with two 180 degree peristaltic tubes as an alternative embodiment. In the FIG. 4 embodiment, the pump will function in either direction of tire rotation shown by the directional arrows. The two air tubes are each operational in a respective direction of rotation to pump air into the tire cavity.

Figure 5:
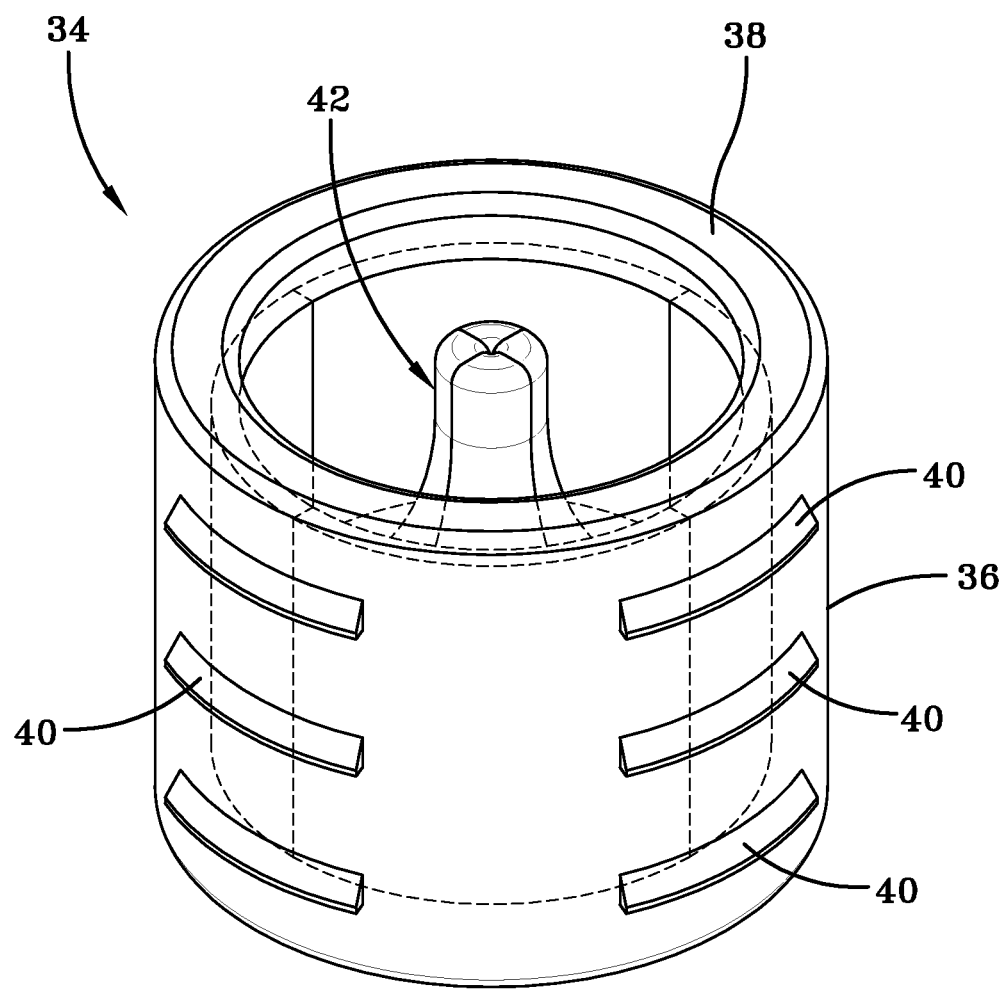
FIG. 5 is a perspective view of a check valve prior to insertion into a peristaltic tube.
Figure 6:
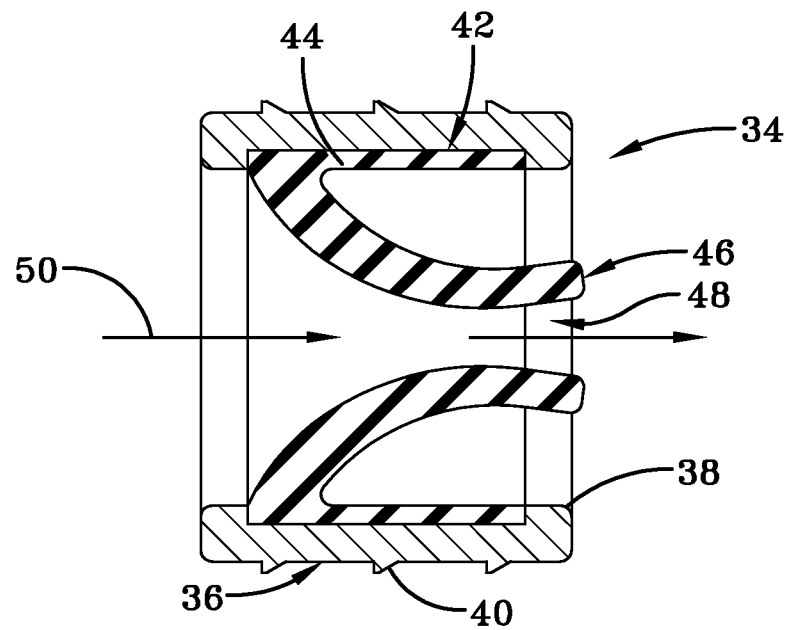
FIG. 6 is a section view of the check valve in the "open" flow position.
Figure 7:
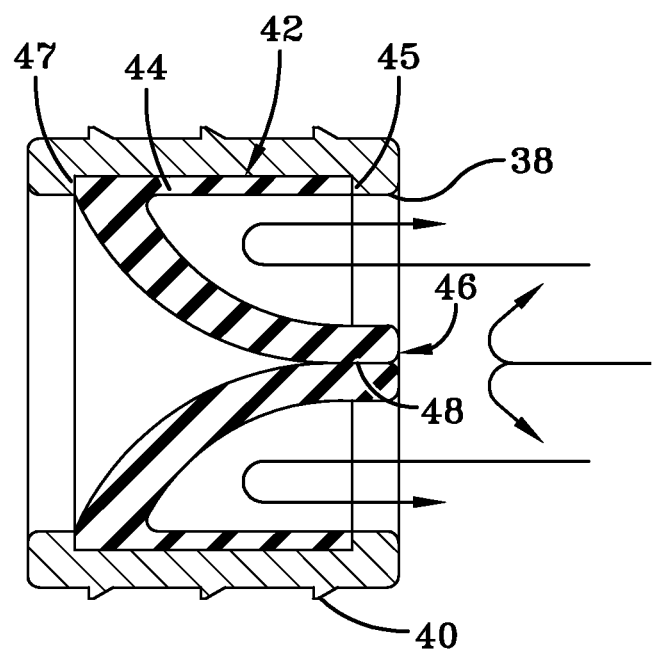
FIG. 7 is a section view of the check valve in the "closed" flow position.

With reference to FIGS. 5, 6 and 7, pursuant to the invention a plurality of check valves 34 are provided for assembly into the passageway 28 of the vein tube 26. The check valve 34 includes a cylindrical valve body 36, composed of any suitable rigid or semi-rigid material. The body 36 has a rounded forward end rim 38. An array of outwardly directed retention ribs or flanges 40 are spaced apart along the surface of the valve body 36, each retention rib angling to the rear of the body. A flexible membrane member 42, of suitable elastomeric composition, is assembled into a central through passage of the cylindrical valve body 36. The membrane member 42 includes a cylindrical membrane body 44 captured within the valve body 36 by in turned end flanges 45, 47 of the valve body 36. The membrane insert 42 further includes a central projecting nose 46 having a slit 48 therethrough. The nose 46 forms a gate through which pressurized air can flow in a forward direction 50 (FIG. 6) but which prevents a back flow of air through the check valve in a rearward direction (FIG. 7).

FIGS. 8, 9 and 10 show an assembly sequence whereby multiple check valves 34 may be inserted into the axial passageway 28 of the elastomeric flexible tube 26. The multiple check valves 34 are designed to occupy spaced apart respective locations within the tube 26 in an orientation which facilitates a flow of pressurized air in a forward direction from the inlet 30 to the outlet 32 but which prevents a back flow of pressurized air in the reverse direction. As seen in FIG. 8, a pressurized air source 52 is positioned to inject pressurized air 54 into the tube passageway 28, whereby radially expanding the tube in the direction 56 so that the passageway 28 assumes a temporary, oversized diameter. A stopper 57 is inserted into a forward end of the tube to prevent the flow 54 from escaping. At the location within the passageway 28 that a check valve 34 is to be located, a clamping collar 58 is affixed over the tube 26 and exerts a radial force 60 on the tube, thereby preventing the tube from expanding at that location. Thereafter, a check valve 34 is inserted into an open end of the tube with the membrane gate opening toward the outlet end of the tube. A rod 62 pushes the check valve 34 through the expanded tube 26 in the direction of arrow 64 until it reaches its intended location within passageway 28, as shown in FIG. 9.

Figure 12:
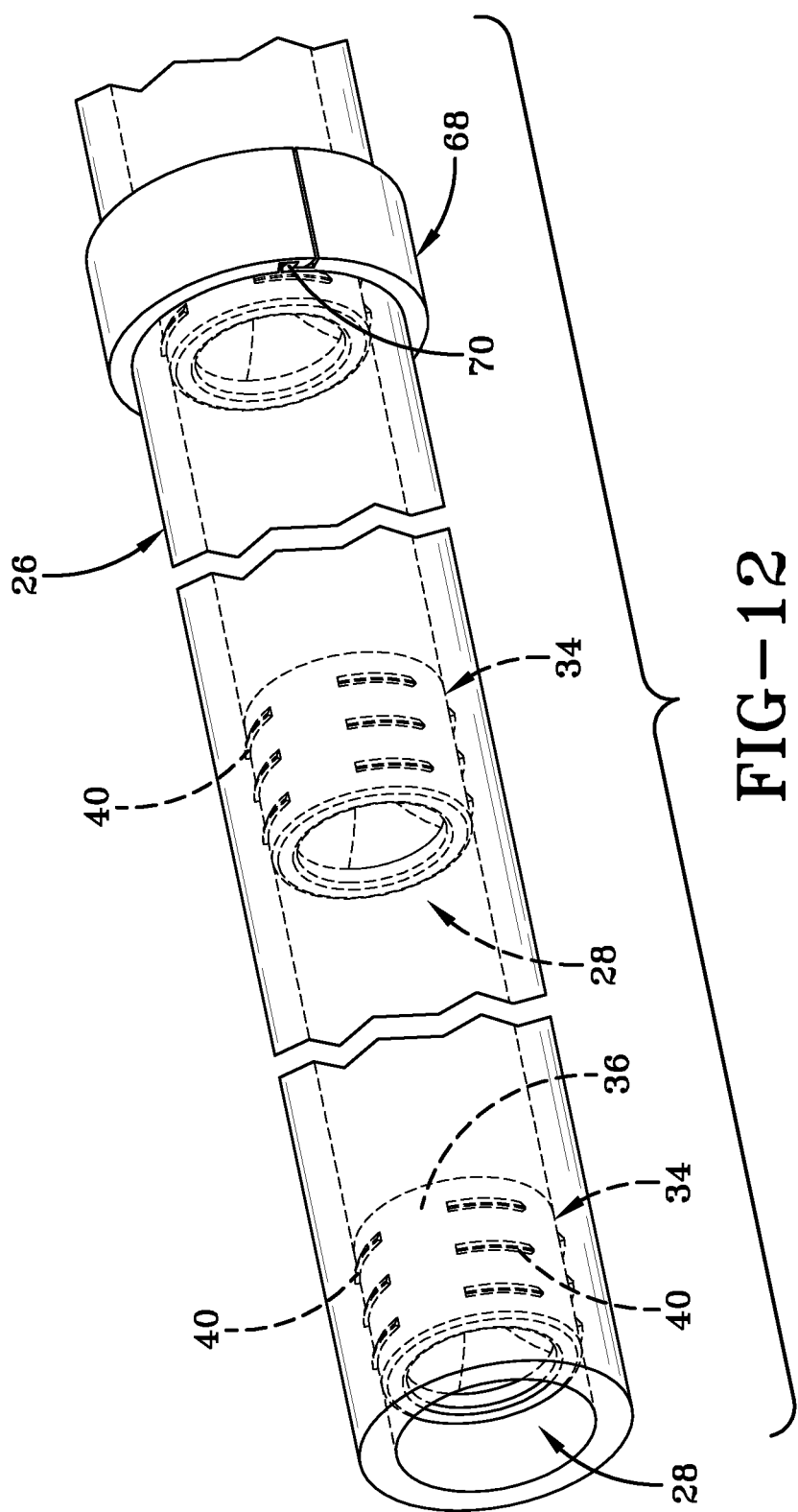
FIG. 12 is a Perspective view of a tube with 3 valves in place. The right valve is retained in its intended location by a clamp.

The clamping collar 58 may then be removed and relocated down the axial length of the tube 26 to a location where a second check valve 66 is to be located. The second check valve 66 is positioned at the open end of the tube and pushed by rod 62 through the diametrically expanded tube into the intended second check valve location 65 within the tube passageway 28. FIG. 10 illustrates insertion of the second check valve 66 by the rod 62. The above procedure is repeated until all of the check valves 34 are in place within the tube 28. Once the pressurized air flow 54 is withdrawn from the tube passageway, the tube 26 elastically radially contracts into its original unexpanded condition. The tube 26 in its resilient radial contraction, thus captures each placed check valve 34 and exerts a radial compression force on the check valve bodies 36 to hold the check valves in their intended locations within the passageway 28. With the radial contraction of the tube, the retention flanges or barbs 40 on the sides of the cylindrical valve body of each check valve 34 engage into the sidewalls of the tube defining the passageway 28, and thus function, in conjunction with the tube radial clamping force on the check valves, to retain the check valves 34 in their intended placement locations. FIG. 12 show the check valves 34 assembled into the tube passageway with the tube in its original, unexpanded diameter and the retention flanges 40 of each valve body 36 engaging into the sidewalls of the tube forming the passageway 28.

Figure 11B:
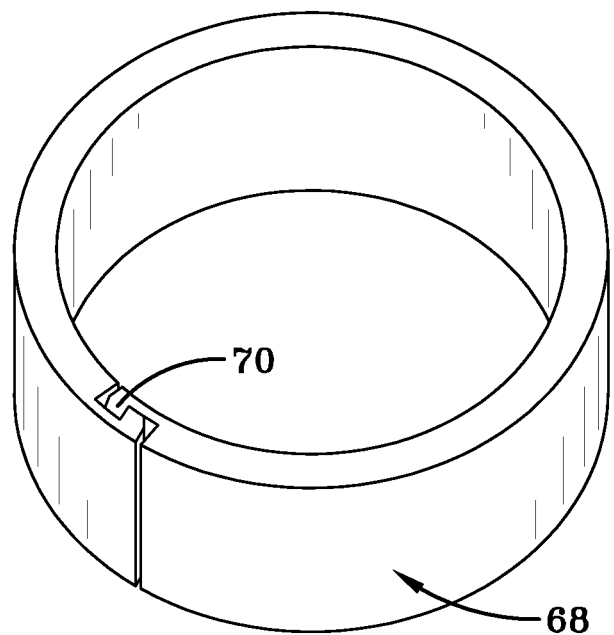
FIG. 11B is a perspective view of a clamp in the "closed" position.
Figure 11A:
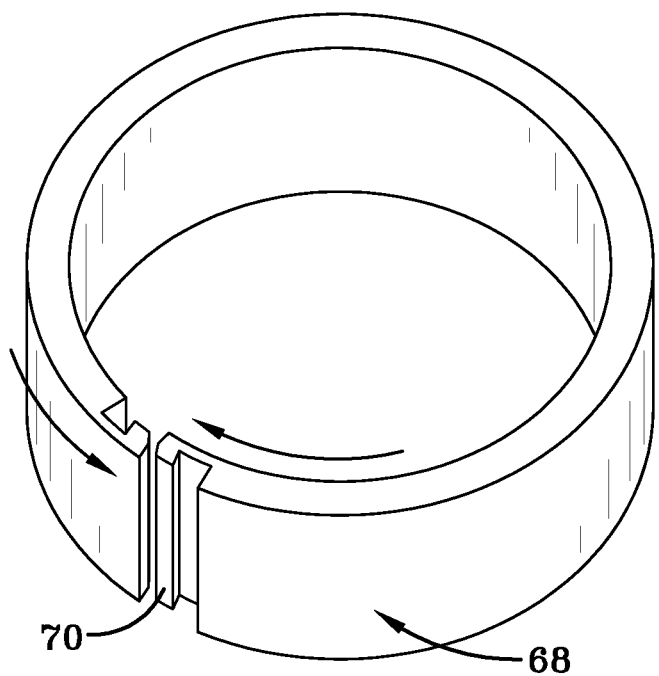
FIG. 11A is a perspective view of a clamp in the "open" position prior to placement over the valve and the tube.

With reference to FIGS. 11A and 11B, multiple secondary retention clamps 68, each in the form of a cylindrical collar, may be deployed over respective locations along the tube 26 where the check valves 34 have been positioned. The clamps 68 are formed of flexible material such as plastic or metal. The clamps 68 open to facilitate receipt of the tube 26 through each clamp. Subsequently, the clamps 68 are closed into a circular configuration and overlapping locking flanges 70 engage to hold each clamp 68 in a closed circular configuration over the tube 26. The opening through the clamps 68 is sized nominally smaller than the tube diametric dimension, so that the clamps 68 in a closed position press the tube radially inward over the check valves.

FIG. 12 shows the placement of the clamps 68 along the tube 26 over respective check valve locations. The resilient radially directed force of the tube 26 combined with engagement of each check valve's retention flanges 40 with internal tube sides and the clamps 68 provide redundant means for retaining each check valve in its intended location within the tube passageway 28. Opening and closing of the check valves 34 during operation of the pump assembly will accordingly not act to dislocate any of the check valves from their positions within the tube passageway.

Figure 14A:
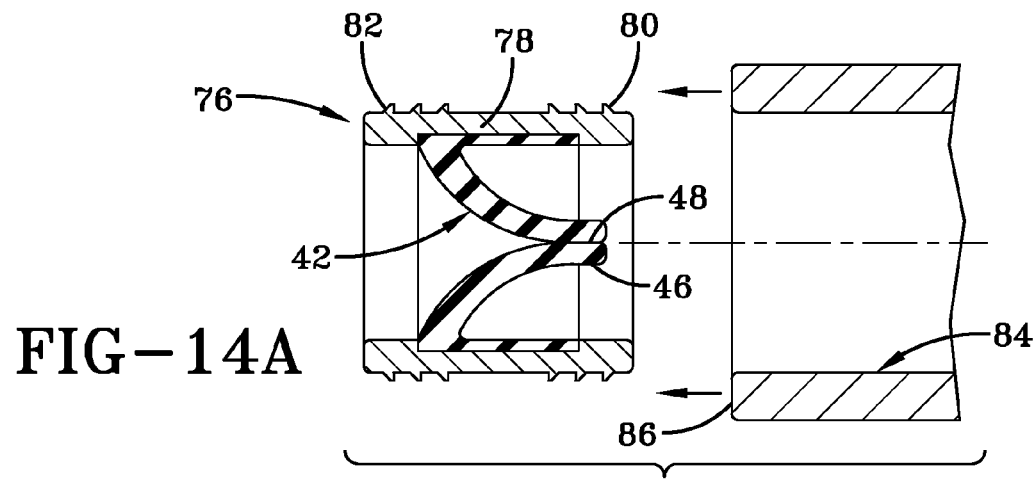
FIG. 14A is a section view showing a tube end going into position over one end of the splice-configure check valve.
Figure 14B:
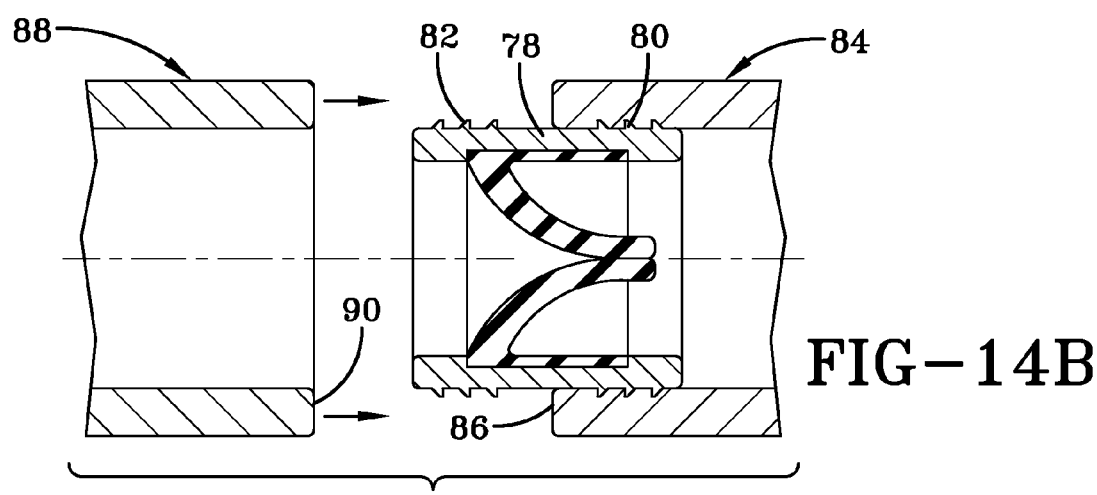
FIG. 14B is a section view showing a second tube end going into position over the other end of the check valve.
Figure 14C:
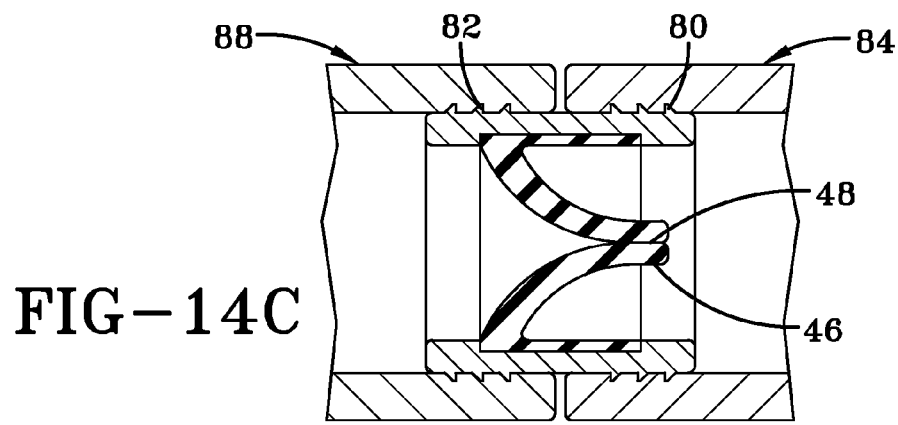
FIG. 14C is a section view showing the check valve with two tubes attached.

It will be appreciated from the drawings, particularly FIGS. 12 and 14C, that the external configuration (geometry) of the air pumping tube remains unaltered by the presence of a check valve or check valves 76. That is, the check valve or check valves 76 create substantially no bulge where present within the air tube 26. As set forth, the tube 26 has a complementary dimension and external geometry to the groove in which the tube 26 is inserted. The groove sidewalls must exert a compressive force against the tube progressively as the tire rotates in order for the tube to efficiently pump and compress air along the tube. Should the presence of check valves at one or more locations along the tube create a bulge, the bulge would disrupt the compression of the tube in that location as the tire rotates. Such a disruption would interfere with smooth generation of compressed air along the tube. Accordingly, the system employed configures the exterior dimension of the check valves such that the check valve(s) operably substantially occupy the air passageway within the tube without disrupting the uniform external uninterrupted configuration and cross-sectional dimension of the air passageway within the tube.

Figure 13:
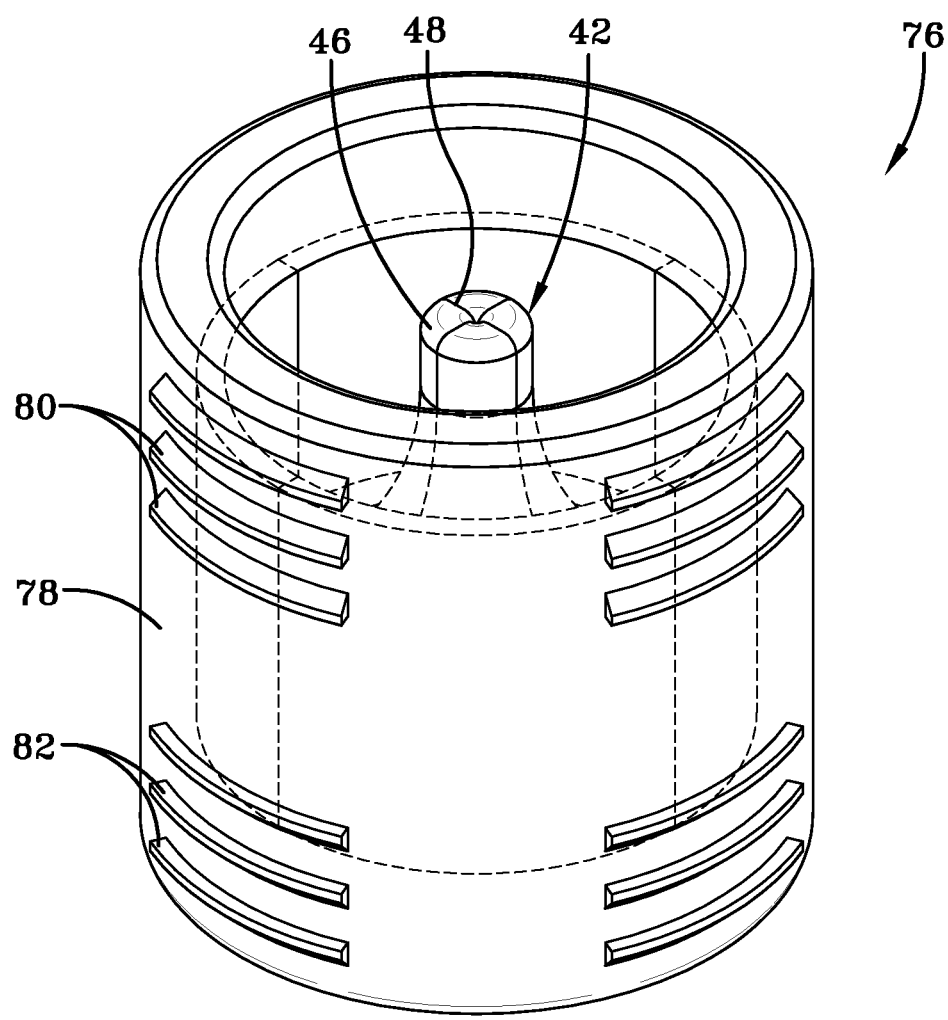
FIG. 13 is a perspective view of an alternative splice-configured check valve.
Figure 15:
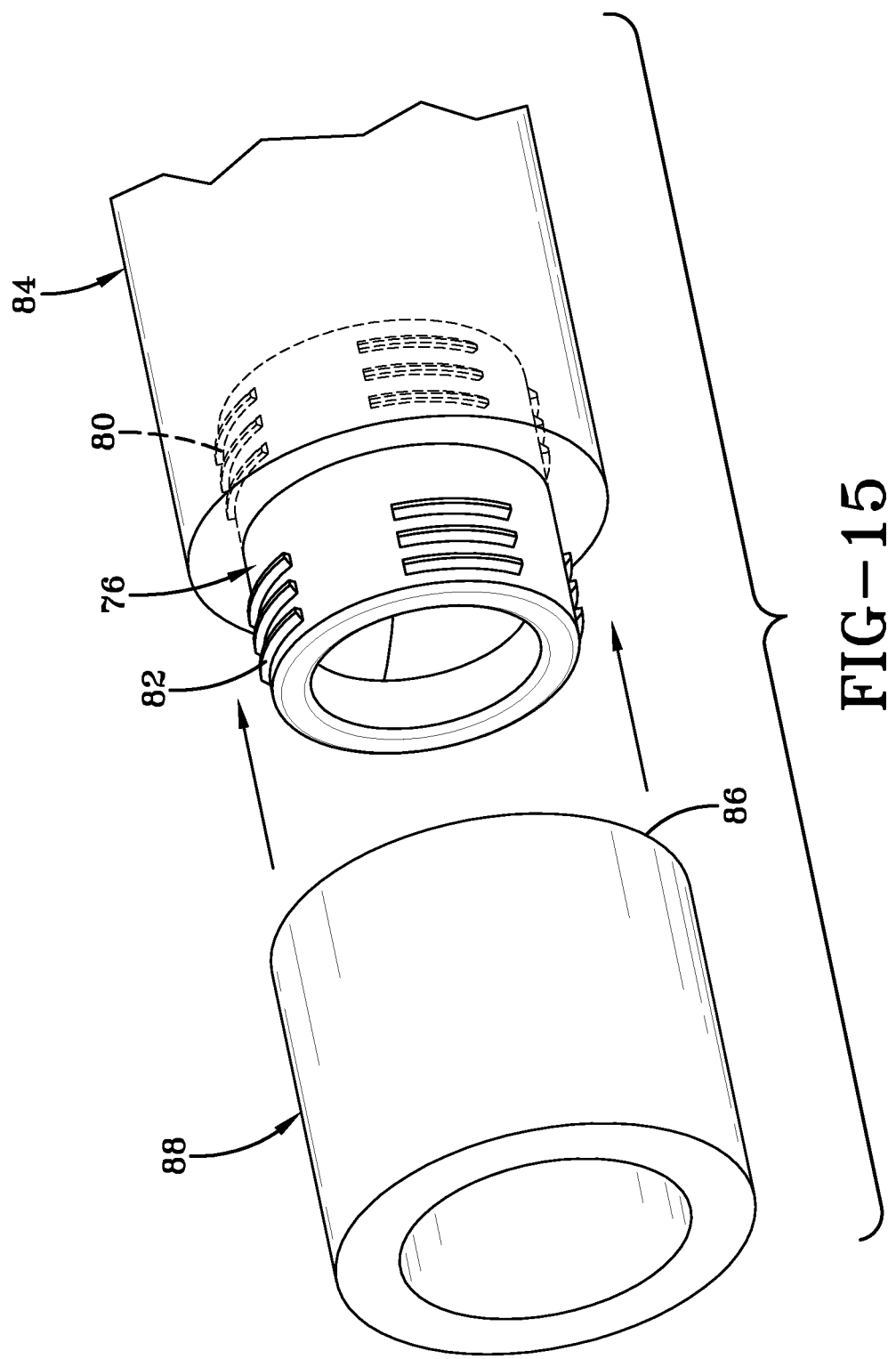
FIG. 15 is a perspective view of the step shown in FIG. 14B.
Figure 16:
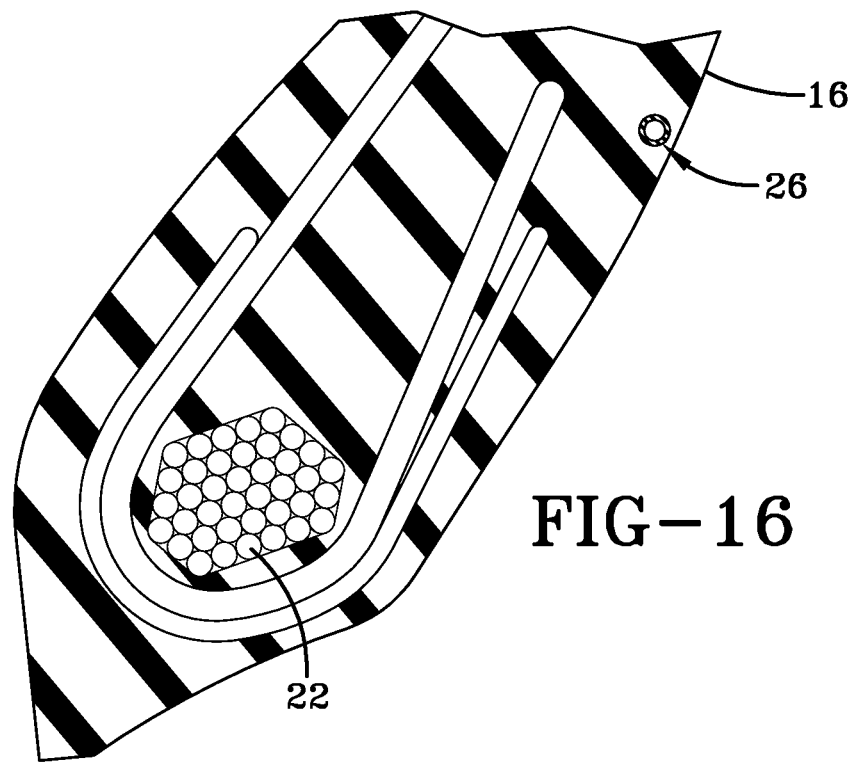
FIG. 16 is a section view taken from FIG. 3 showing the tube.
Figure 17:
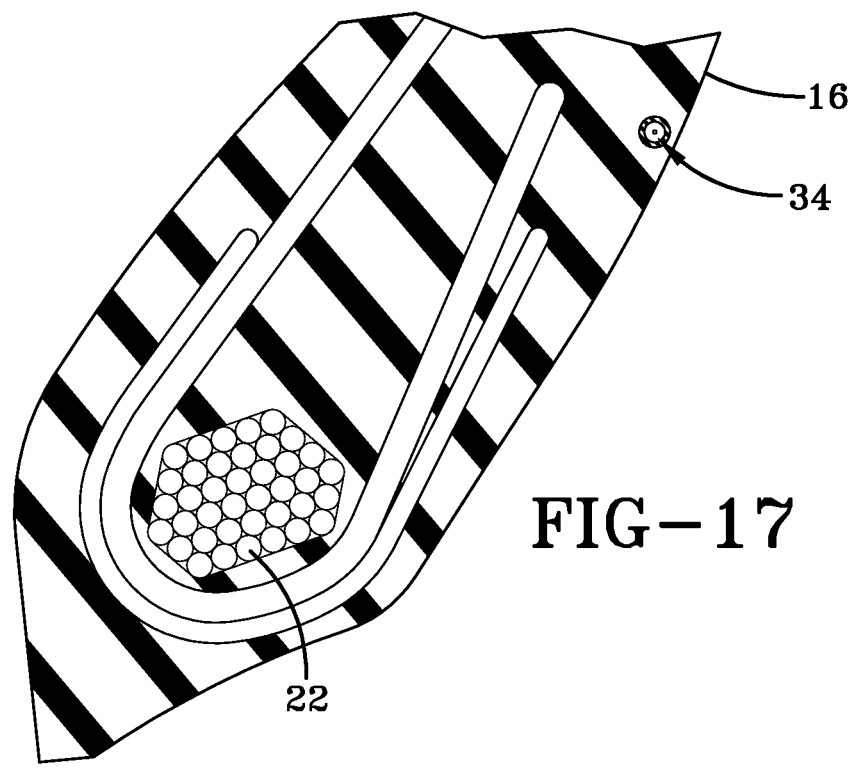
FIG. 17 is a section view taken from FIG. 3 showing the check valve in the tube.

Referring to FIG. 13, an alternatively configured check valve 76 is shown in a splice configuration. The check valve 76 has a relatively more elongate cylindrical valve body 78. First and second arrays of retention flanges or barbs are provided, the first array 80 at a forward location along the body 78 and the second array 82 at a rearward location. The body 78, as will be seen in FIGS. 14A, 14B and 14C, has a centered membrane insert configured to operate in the manner previously explained. The elongate body 78 is used for the purpose of splicing two segments of tube 84, 88 together. An end 86, 90 of each of the tubes 84, 88 attaches over a respective end of the body 78 (FIGS. 14A, 14B, 15), whereupon the barb arrays 80, 82 engage internal sidewalls of the tube ends 86 as shown in FIGS. 14C and 15.

With reference to FIGS. 1, 3, 16 and 17, upon completed assembly of the check valves 34 into the tube passageway 28, the tube 26 is inserted into a complementarily configured channel formed within a tire sidewall 16. The lower sidewall region shown in FIGS. 16 and 17 above the bead region 22 flexes sufficiently to allow for the segment by segment air pumping action by the tube described previously. If desired, higher locations on the tire sidewall may be used as the location for the vein pump tube 26 without departing from the invention. One or both of the tire sidewalls may contain an air pumping tube if desired, and the system may be configured in a 180 degree, 360 degree (shown at 74 of FIG. 3), or dual 180 degree tube configuration.

While the tube shown in FIG. 1 is generally of circular cross-section, alternative tube sectional configurations may be used. FIG. 18 shows in cross-section circular tube 26 having a circular through passageway 92. FIG. 19 shows a circular tube 26 modified to have an elliptical air passageway 94. FIG. 20 shows a mushroom shaped tube 96 having adjoining cap 98 and plug 102 tube components. The tube fits into a sidewall groove with the cap abutting an outer sidewall surface. An elliptical air passageway 100 extends through the tube. FIG. 21 shows a mushroom shaped tube with a circular air passageway 104. It will be understood that the check valves (such as 34) will have a complementary external shape and configuration to the shape of the air passageway into which the check valves are positioned. Likewise, the clamping mechanisms (such as 68) will be configured to fit over the tube configuration in order to impose a radial clamping force on a check valve.

Figure 22:
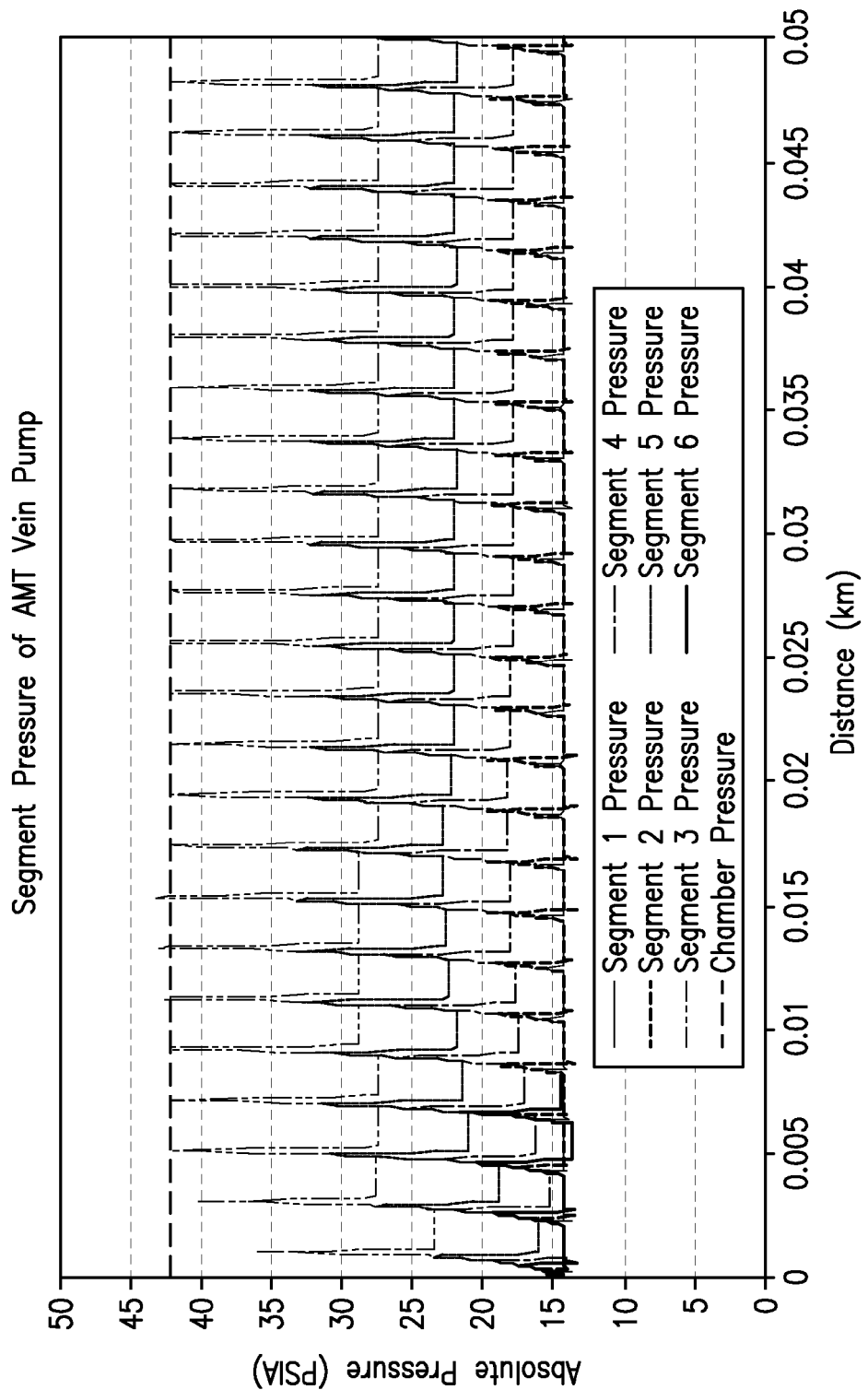
FIG. 22 is a graph showing segment pressure of an AMT Vein pump showing pressure vs. distance (km).

FIG. 22 shows a chart for a multi-segment AMT Vein Pump and graphs absolute pressure (PSA) vs. distance travelled by the tire (km). FIG. 22 illustrates the amplification of segment pressure as the tube forces air through the series of tube segments, adjacent segments being separated by a check valve. The check valves between the tube segments open only in a forward direction between air inlet and air outlet and do not allow any back flow of air within the tube in a reverse direction. In stringing a series of segments together, adjacent segments separated by a check valve, a vein-type system is constructed. The adjoining segments sequentially pump air segment to segment as the tire-mounted tube moves through a rolling tire footprint. The check valves prevent a back flow of air and operate to increase the pumping efficiency of the vein/tube system. Consequently, the vein/tube volumetric size may be as small as possible without compromising achievement of the requisite air pumping volume necessary for maintaining the tire at its rated pressure. The check valve and vein segment construction thus serves to improve to the air pressure level at the outlet portal beyond what would be attained from a single segment, non-check valve, tube of equal length.

Figure 23:
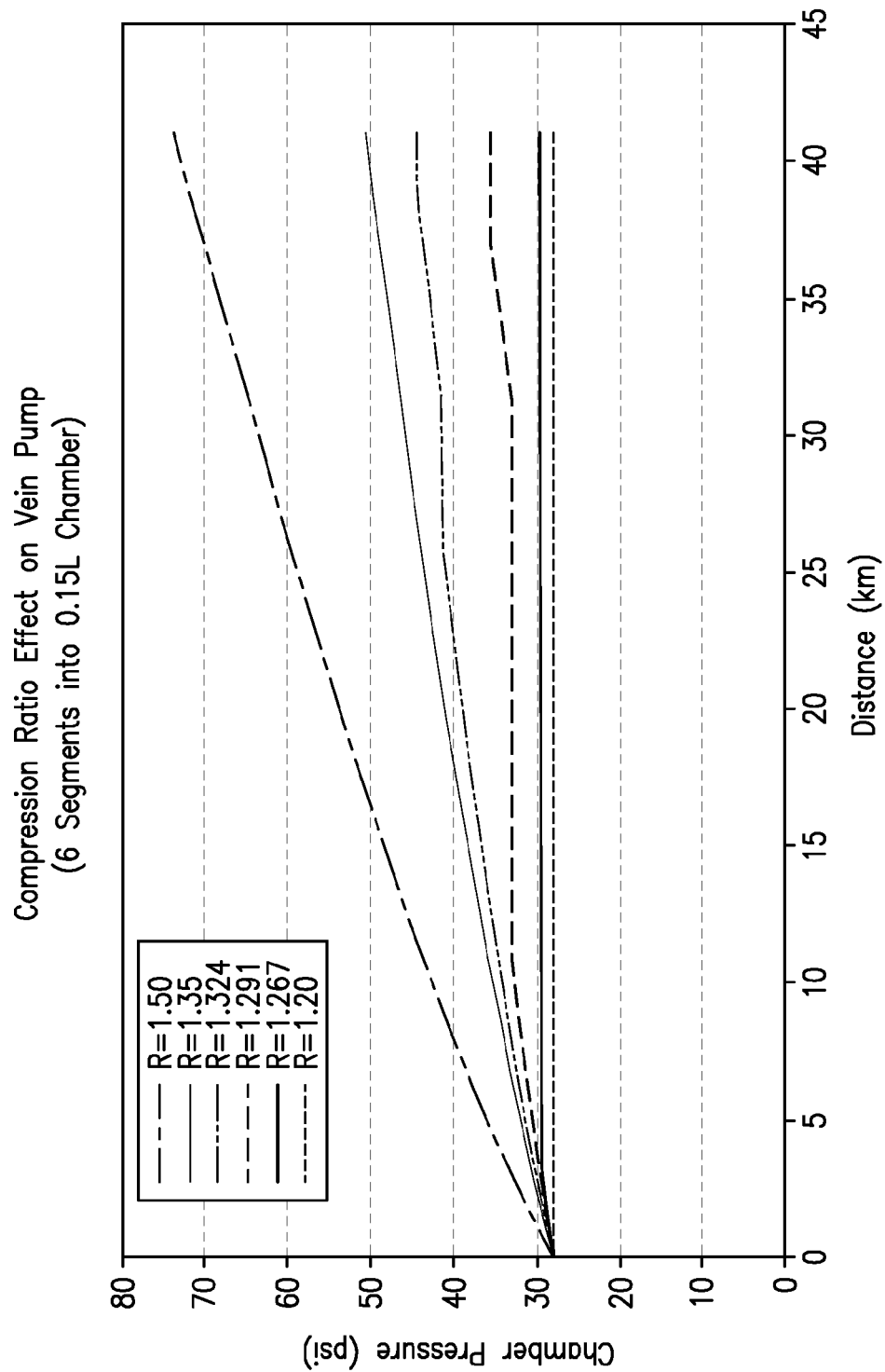
FIG. 23 is a graph of compression ratio effect on a vein pump showing chamber pressure vs. distance.

FIG. 23 represents a case study graph on the compression ratio effect of the vein pump using a six segment assembly into a 0.15 L chamber. The compression ratios R=1.50, 1.35, 1.324, 1.291, 1.267 and 1.20 are graphed. As the distance (km) travelled increases, the chamber pressure increases, with R=1.5 yielding the greatest increase.

Figure 24:
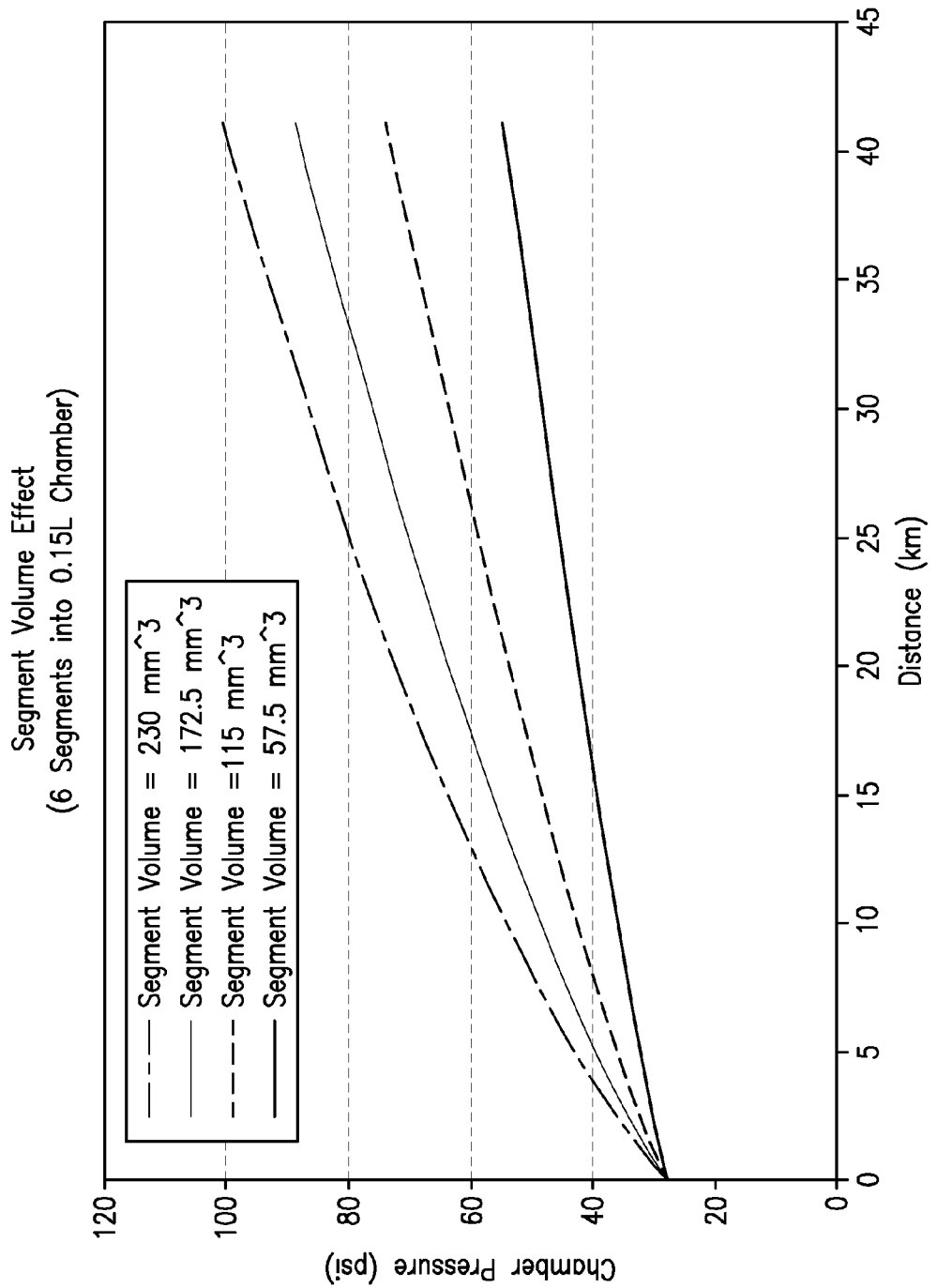
FIG. 24 is a graph of segment volume effect in a six segment tube having a 0.15 L Chamber.

FIG. 24 shows a case study graph on the segment volume effect on a vein pump employing a six segment assembly delivering pressurized air to a 0.15 L chamber. The segment volumes graphed are 57.5, 114, 172.5 and 230 cubic mm. The chamber pressure vs. distance (km) travelled show the chamber pressure increasing with distance, with the larger segment volume attaining a higher pressure level.

Figure 25:
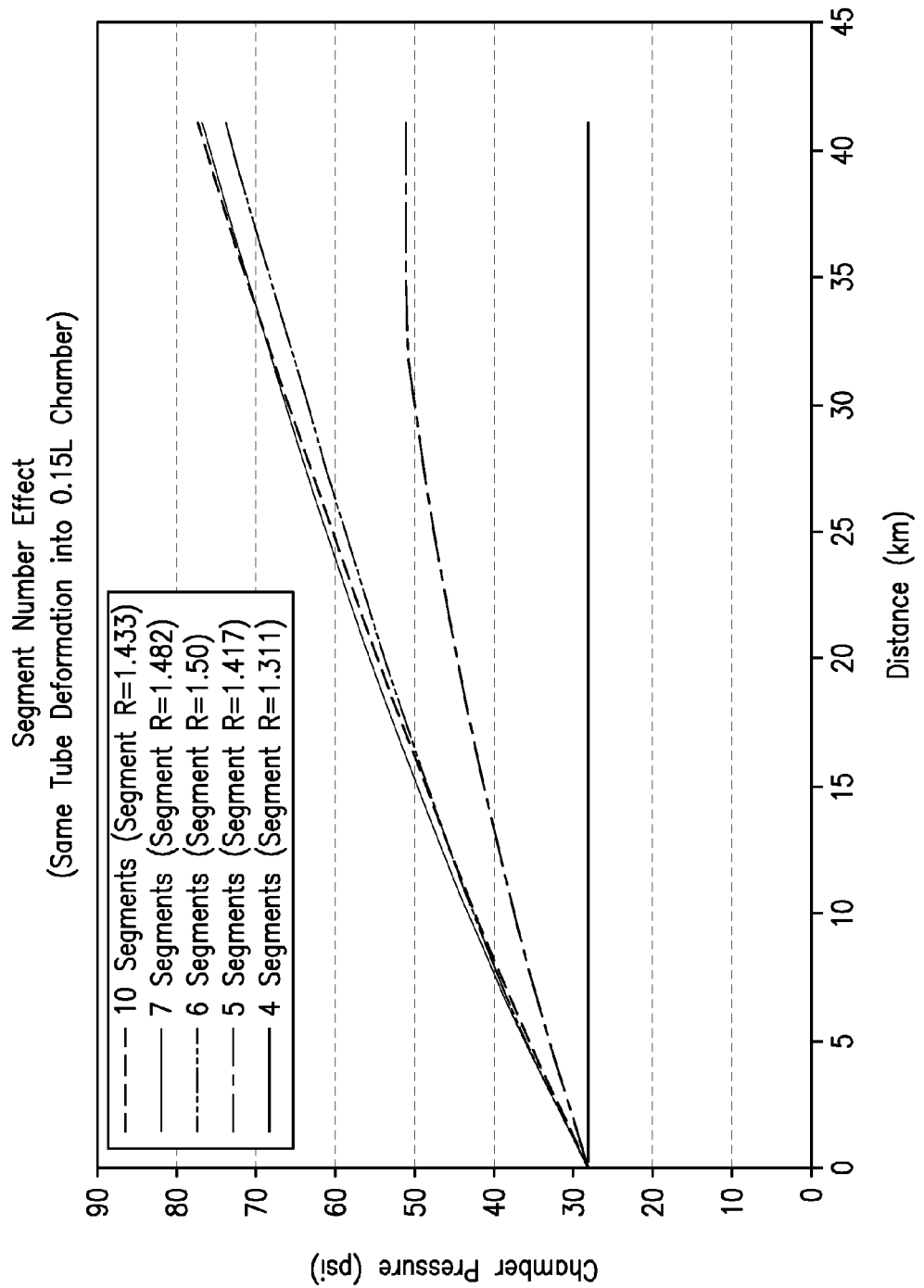
FIG. 25 is a graph showing the effect of segment number on chamber pressure.

FIG. 25 show a case study graph on the effect of segment number. The number of segments examined are vein pumps having 10, 7, 6, 5, 4 segments, each segment having a radius shown in FIG. 25. The chamber pressure is graphed against distance travelled. The graph indicates that the greater the number of segments utilized in the vein pump, the higher chamber pressure attained. The graphs for 10, 7 and 6 segments, however, are relatively coincidental, implying that increasing the number of segments beyond a certain point results does not provide significant benefit.

Figure 26:
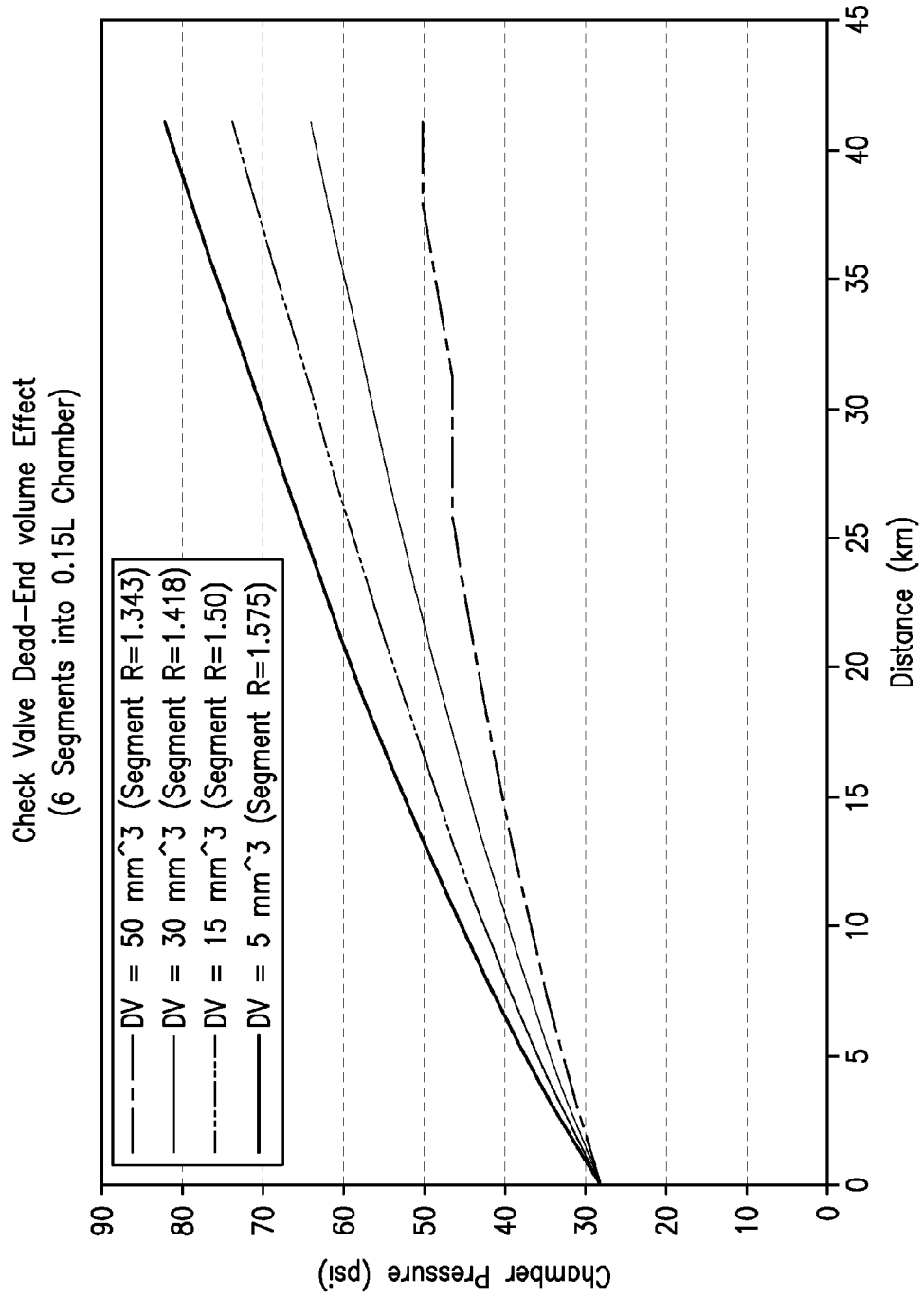
FIG. 26 is a graph showing check valve dead-end volume effect in a six segment tube configuration.

FIG. 26 graphs in the case study (six segments, 0.15 L chamber) the check valve dead-end volume effect resulting from a variance in segment radius. The chamber pressure vs. distance travelled lines show that the dead-end volume of 5 cubic mm results in a highest chamber pressure at a segment radius R—1.575.

Figure 27:
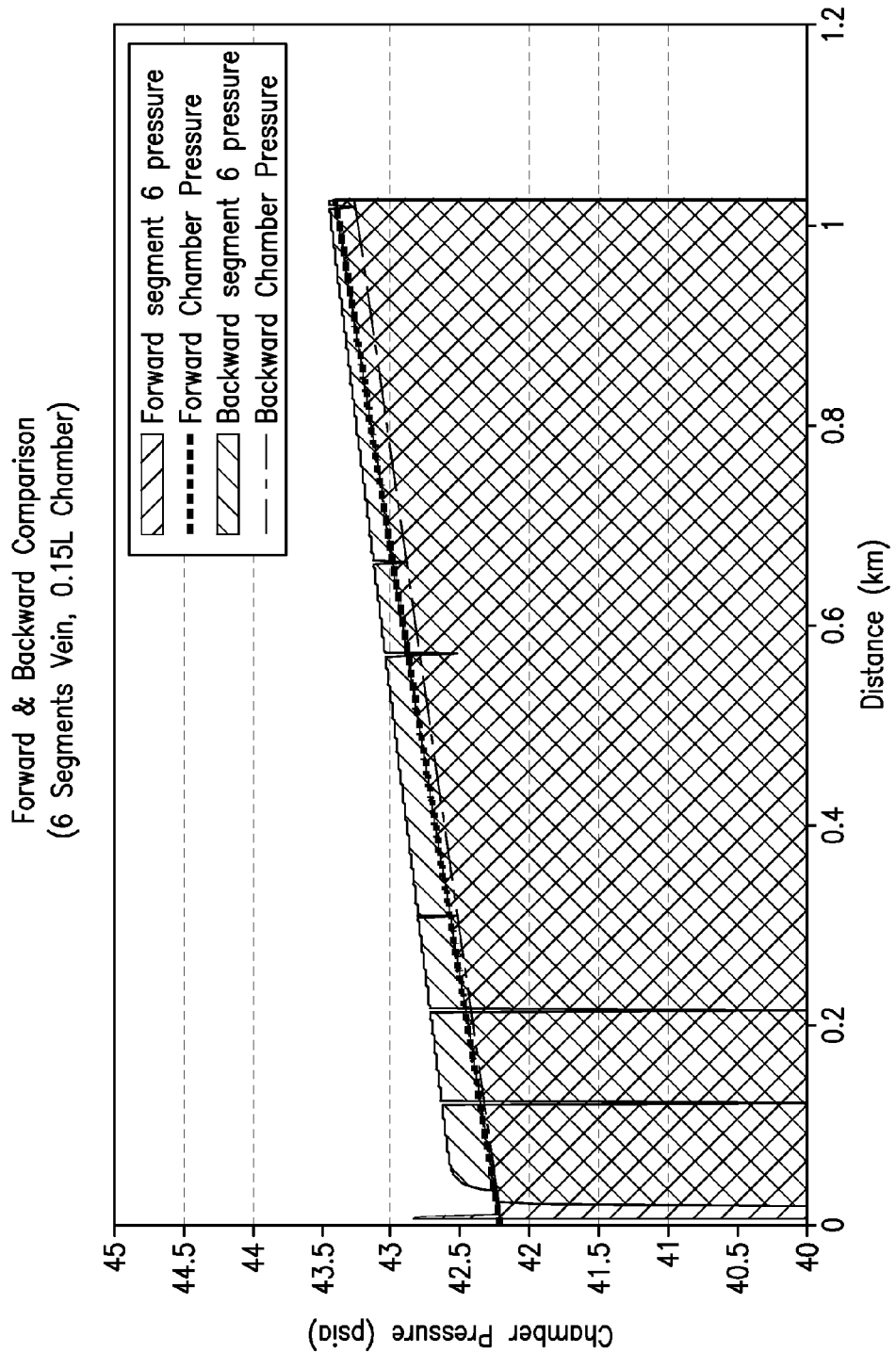
FIG. 27 is a graph comparing forward and backward tube performance.

FIG. 27 graphs a comparison between forward and rearward tire rotational direction under the controlled case study parameters. The chamber pressure vs. distance travelled is graphed for forward segment-6 pressure; forward chamber pressure; backward segment 6 pressure; and backward chamber pressure. The graph indicates a consistent performance of the vein pump in both forward and rearward directions.

Figure 28:
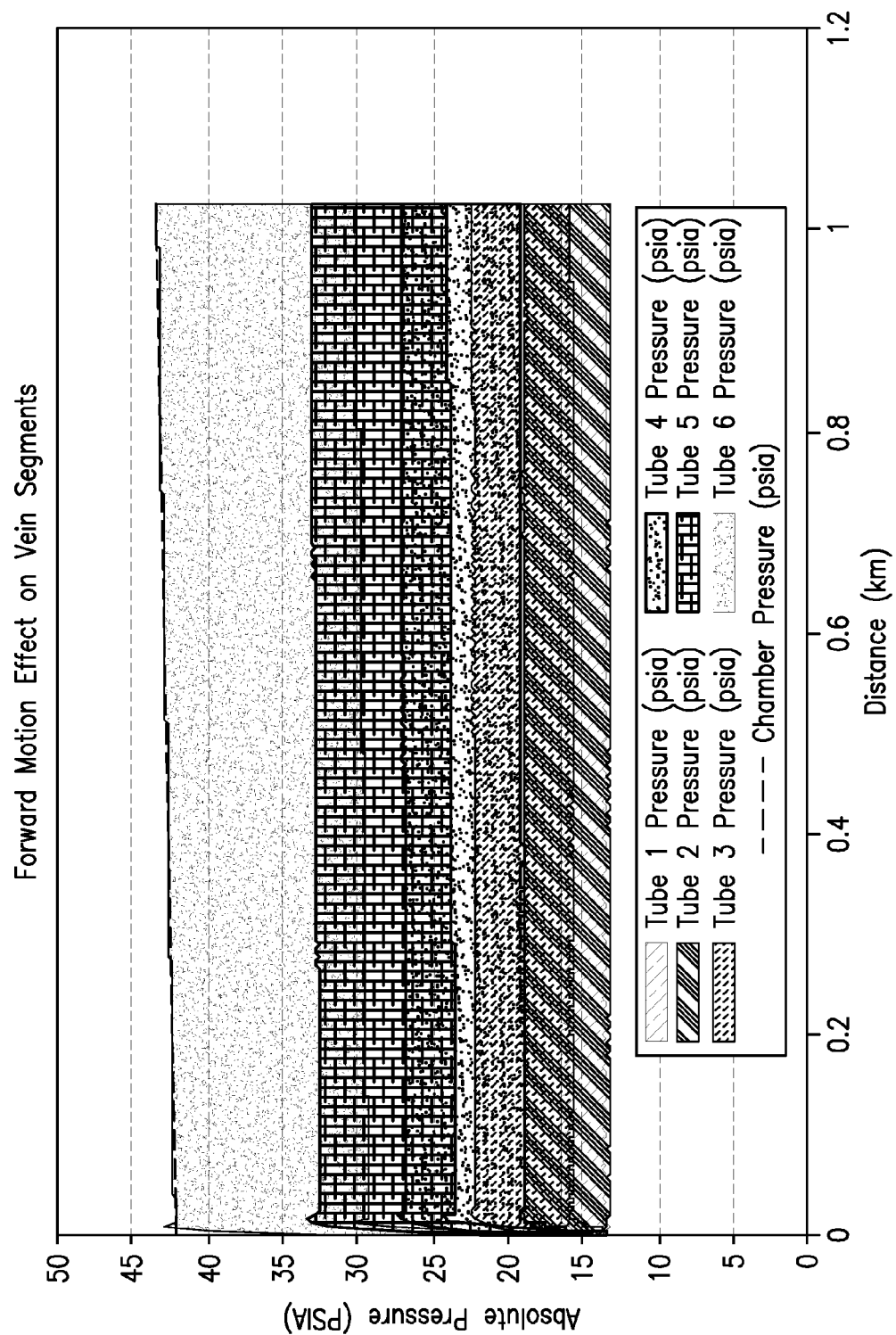
FIG. 28 is a graph showing the effect of forward motion on the vein segments.

FIG. 28 shows forward motion effect on the vein segments, graphing absolute pressure of each of the six segments vs. distance travelled. As shown thereby, the pressure increases from segment to segment, 1-6, with the greatest absolute pressure present in segment six.

Figure 29:
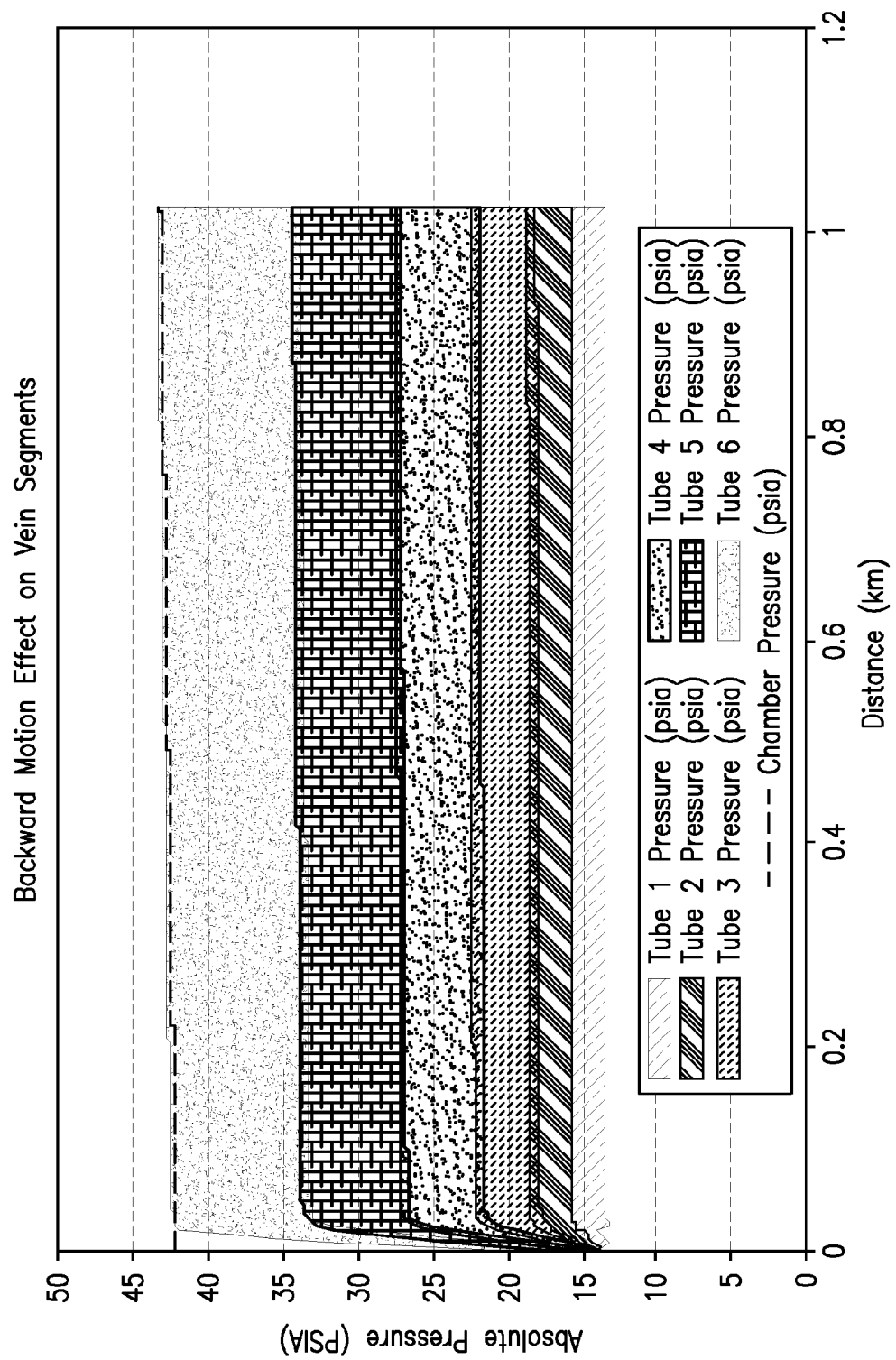
FIG. 29 is a graph showing the effect of backward motion on the vein pressure.

FIG. 29 is a graph showing the effect of backward motion on the vein pressure.

Figure 30:
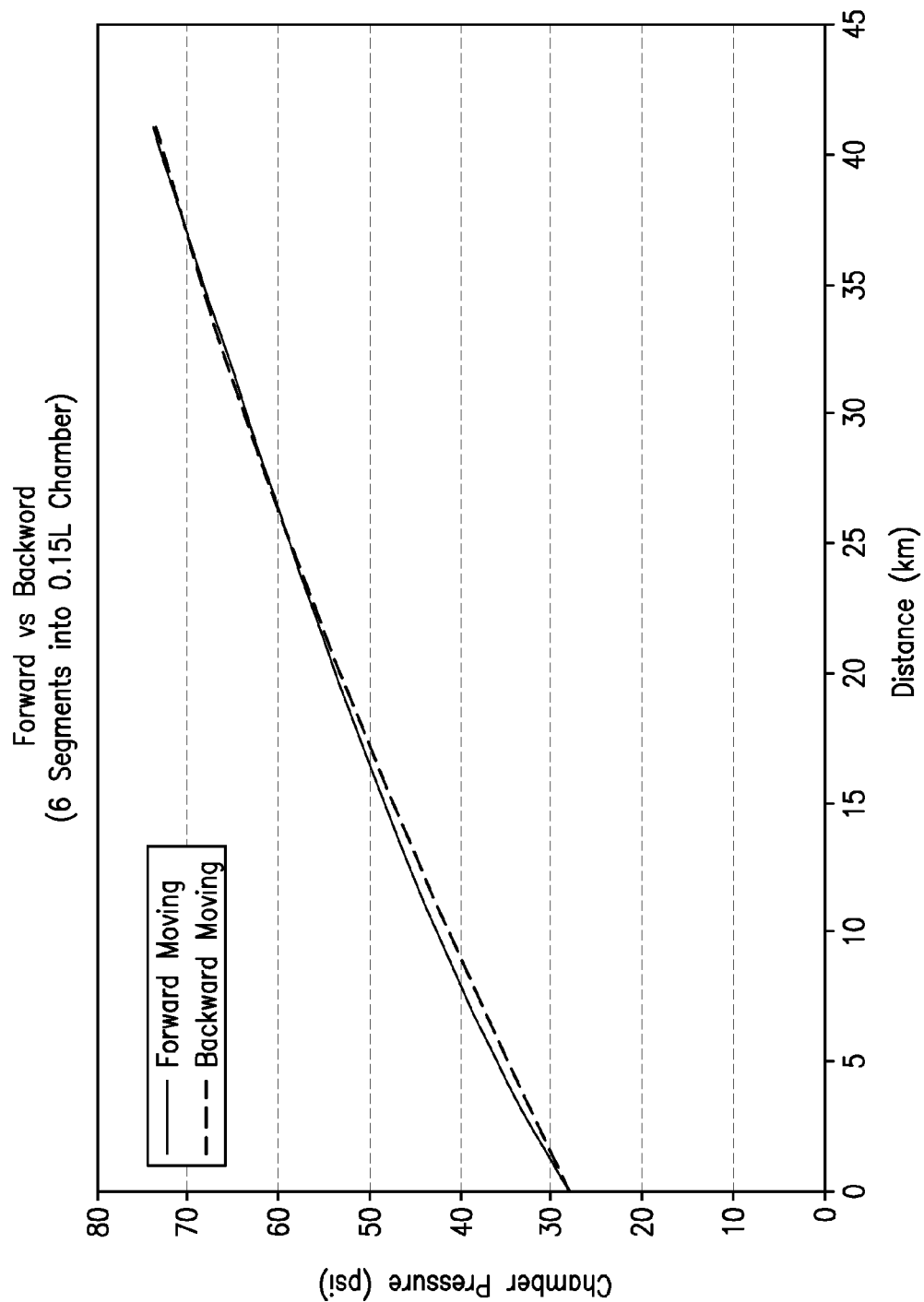
FIG. 30 is a graph comparing forward vs. backward chamber pressure.

FIG. 30 is a graph comparing forward vs. backward chamber pressure.

From the foregoing empirical verification, it will be understood that the subject vein pump assembly in a tire achieves significant advantage over a single, non-segmented peristaltic tube system. The vein concept utilizes one tube and multiple check valves inside a tubing, which is divided by the check valves into a series of tube segments. The check valves provide one-way air flow through the one-way check valves, each aligned to open toward an outlet port of the vein pump. Standard flexible tuber is used. The method of check valve placement contemplates:

(A) One end of the tubing is opened;
(B) A clamping fixture may be placed around the tube where a check valve is to be located;
(C) A check valve is dropped or forced into the tubing until positioned by the clamping fixture;
(D) The clamping fixture is moved to a second location along the tube where a second check valve is to be placed;
(E) A second check valve is dropped or forced into the tubing to its intended position within the tube passageway;

(F) Steps b through e are repeated until all of the check valves are in place;

(G) clamping collar may be affixed around the tube at each check valve location to hold the check valve in place. The check valve may further be oversized with respect to the tube passageway and include one or more retention flanges which engage sidewalls defining the tube passageway.

The above method may further be modified to include radial expansion of the air passageway by forced air injection so as to enlarge the passageway for receipt of the check valves therein.

The subject vein system may utilize a single, unitary tube length separated into segments by the inserted check valves, or multiple discrete tube segments joined together by the check valve bodies. As a result, the subject system controls the direction of air flow and eliminates loss of air from back flow. The vein pump requires a relatively low tire sidewall deformation to achieve a requisite pressure build. Consequently, the vein system is relatively forgiving and can accept tire or vein tube groove variation or non-uniformity. The vein system further is tolerant of rim variation. A higher efficiency is thus achieved by using a multi-segmented tube system resulting in a higher compression ratio at the final segment due to the amplification effect. Any issue with dead-end volume is also eliminated.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air maintenance tire and air pump assembly comprising:
    a tire having a tread region and first and second sidewalls extending from the tread region;
    an elongate tubular air passageway enclosed within a flexing region of a tire wall, the air passageway having an air inlet portal operable to admit air into the air passageway and an outlet portal spaced apart from the inlet portal operable to withdraw pressurized air from the air passageway, the air passageway having a uniform external uninterrupted configuration and cross-sectional dimension between the inlet portal and the outlet portal operable to close segment by segment in reaction to induced forces from the tire flexing region as the flexing region of the tire wall rotates opposite a rolling tire footprint;
    at least one check valve device seated within the elongate passageway at a preferred location and dividing the elongate passageway into an upstream passageway segment and a downstream passageway segment; the at least one check valve device having a cross-sectional dimension and external configuration operable to substantially occupy the air passageway without disrupting the uniform external uninterrupted configuration and the cross-sectional dimension of the air passageway in an uncollapsed condition across the preferred location, and the at least one check valve device having a valve gate operable in an open position to allow pressurized air to directionally pass through the at least one check valve body from the upstream passageway segment to the downstream passageway segment, and the valve gate operable in a closed position to prohibit air from passing through the at least one check valve body from the downstream passageway segment to the upstream passageway segment;
    wherein a flow of pressurized air through the at least one check valve device extends in one axial direction along the air passageway from the air inlet portal of the elongate air passageway toward the air outlet portal of the air passageway; and
    wherein the at least one check valve device comprises a tubular body and a flexible membrane member, the flexible membrane member being captured within the tubular body and between flanges formed on the tubular body, and the tubular body having a cross-sectional dimension closely received within the air passageway at the preferred location of the check valve device in an interference fit whereby passageway sidewalls defining the air passageway operably engage and exert a radially directed compressive force on the tubular body to hold the tubular body at a preferred location within the air passageway.

2. The air maintenance tire and air pump assembly of claim 1, wherein the tubular body comprises at least one outwardly directed retention barb formed on an outer surface of the tubular body, the barb engaging into a passageway sidewall to hold the tubular body at the preferred location within the air passageway.

3. The air maintenance tire and air pump assembly of claim 1, wherein the flexible membrane member operably opens along a slit to admit pressurized air from one side of the membrane member through the membrane member.

4. The air maintenance tire and air pump assembly of claim 1, wherein the air passageway comprises an axial passageway through an air tube composed of flexible material, the air tube extending continuously between the inlet and the outlet portals.

5. The air maintenance tire and air pump assembly of claim 1, wherein the air passageway comprises an elongate multi-segmented flexible air tube formed from a plurality of air tube segments, and wherein the at least one check valve device is positioned between and connects at opposite ends from within the air passageway an adjoining pair of the air tube segments.

6. The air maintenance tire and air pump assembly of claim 1, wherein the air passageway comprises an axial passageway through an elongate air tube composed of flexible material, the air tube extending continuously between the inlet and the outlet portals; and wherein the assembly further comprises an interlocking clamping collar affixed externally to the air tube over the location of the at least one check valve device within the elongate tube air passageway.

7. An air maintenance tire and air pump assembly comprising:
    a tire having a tread region and first and second sidewalls extending from the tread region;
    an elongate tubular air passageway enclosed within a flexing region of a tire wall, the air passageway having an air inlet portal operable to admit air into the air passageway and an outlet portal spaced apart from the inlet portal operable to withdraw pressurized air from the air passageway, the air passageway having a uniform uninterrupted external configuration and cross-sectional dimension between the inlet portal and the outlet portal in an uncollapsed state with the tire, and the air passageway operably closing segment by segment in reaction to induced forces from the tire flexing region as the flexing region of the tire wall rotates opposite to a rolling tire footprint;

the elongate air passageway having a plurality of spaced apart check valve devices within and spaced apart along the axial air passageway and dividing the air passageway into a plurality of air passageway segments;

each check valve device having a cross-sectional dimension and external configuration operable to substantially occupy the air passageway at respective preferred locations within the air passageway, and each check valve device having a valve gate operable in an open position to allow pressurized air to directionally pass through the check valve body from an upstream passageway segment to a downstream passageway segment, and the valve gate operable in a closed position to prohibit air from passing through the check valve body from the downstream passageway segment to the upstream passageway segment;

wherein a flow of pressurized air through the check valve device extends in one axial direction along the air passageway from the air inlet portal of the elongate air passageway to the air outlet portal of the air passageway; and wherein each check valve device comprises a tubular body and a flexible membrane member, the flexible membrane member being captured within the tubular body and between flanges formed on the tubular body, and the tubular body being closely received within the air passageway in an interference fit, and wherein passageway sidewalls defining the air passageway operably engage and exert a radially directed compressive force on the tubular body to hold the tubular body at a preferred location within the air passageway.

8. The air maintenance tire and air pump assembly of claim 7, wherein the flexible membrane member operably opens along a slit to admit pressurized air from one side of the membrane member through the membrane member.

9. The air maintenance tire and air pump assembly of claim 7, wherein the tubular body comprises at least one outwardly directed retention barb formed on an outer surface of the tubular body, the barb engaging into a passageway sidewall to hold the tubular body at the preferred location within the air passageway.

10. The air maintenance tire and air pump assembly of claim 7, wherein the air tube substantially extends in a 180 degree arcuate path along the one tire sidewall.

11. The air maintenance tire and air pump assembly of claim 7, wherein the air tube substantially extends in a 360 degree circular path that circumscribes the one tire sidewall.

12. The air maintenance tire and pump assembly of claim 7, wherein the plurality of air passageway segments total at least three.

* * * * *